(12) United States Patent
Lin et al.

(10) Patent No.: US 12,092,831 B2
(45) Date of Patent: Sep. 17, 2024

(54) EYEPIECES FOR USE IN WEARABLE DISPLAY SYSTEMS

(71) Applicant: Magic Leap, Inc., Plantation, FL (US)

(72) Inventors: Dianmin Lin, Los Altos, CA (US); Pierre St. Hilaire, Belmont, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 18/514,500

(22) Filed: Nov. 20, 2023

(65) Prior Publication Data

US 2024/0085705 A1    Mar. 14, 2024

Related U.S. Application Data

(63) Continuation of application No. 18/077,030, filed on Dec. 7, 2022, now Pat. No. 11,899,216, which is a continuation of application No. 17/082,729, filed on Oct. 28, 2020, now Pat. No. 11,543,664.

(60) Provisional application No. 62/928,798, filed on Oct. 31, 2019.

(51) Int. Cl.
 *G02B 27/01* (2006.01)
 *F21V 8/00* (2006.01)

(52) U.S. Cl.
 CPC ....... *G02B 27/0172* (2013.01); *G02B 6/0036* (2013.01); *G02B 6/0076* (2013.01); *G02B 2027/0123* (2013.01); *G02B 2027/014* (2013.01); *G02B 2027/0178* (2013.01)

(58) Field of Classification Search
 CPC .............. G02B 27/0172; G02B 27/143; G02B 2027/0178; G02B 5/09; G02B 5/10; G02B 3/08; G02B 6/0036; G02B 6/0076
 See application file for complete search history.

(56) References Cited

U.S. PATENT DOCUMENTS

| | | |
|---|---|---|
| 7,758,185 B2 | 7/2010 | Lewis |
| 8,353,594 B2 | 1/2013 | Lewis |
| 8,696,113 B2 | 4/2014 | Lewis |
| 8,733,927 B1 | 5/2014 | Lewis |
| 8,733,928 B1 | 5/2014 | Lewis |
| 9,010,929 B2 | 4/2015 | Lewis |
| 9,235,064 B2 | 1/2016 | Lewis |
| 9,239,473 B2 | 1/2016 | Lewis |
| 9,244,293 B2 | 1/2016 | Lewis |
| 9,658,473 B2 | 5/2017 | Lewis |

(Continued)

OTHER PUBLICATIONS

Azuma, "A Survey of Augmented Reality," Presence: Teleoperators and Virtual Environments, Aug. 1997, 6(4):355-385.

(Continued)

*Primary Examiner* — Priyank J Shah
(74) *Attorney, Agent, or Firm* — Fish & Richardson P.C.

(57) ABSTRACT

An example a head-mounted display device includes a light projector and an eyepiece. The eyepiece is arranged to receive light from the light projector and direct the light to a user during use of the wearable display system. The eyepiece includes a waveguide having an edge positioned to receive light from the display light source module and couple the light into the waveguide. The waveguide includes a first surface and a second surface opposite the first surface. The waveguide includes several different regions, each having different grating structures configured to diffract light according to different sets of grating vectors.

10 Claims, 18 Drawing Sheets

(56) References Cited

U.S. PATENT DOCUMENTS

| | | | |
|---|---|---|---|
| 10,151,937 B2 | 12/2018 | Lewis | |
| 10,185,147 B2 | 1/2019 | Lewis | |
| 10,429,645 B2 | 10/2019 | Vallius | |
| 10,598,938 B1 * | 3/2020 | Huang | G02B 6/4214 |
| 10,852,547 B2 | 12/2020 | Bhargava et al. | |
| 2018/0188528 A1 | 7/2018 | Browy et al. | |
| 2020/0271936 A1 * | 8/2020 | Leibovici | G03H 1/0244 |

OTHER PUBLICATIONS

Azuma, "Predictive tracking for augmented reality." Dissertation for the degree of Doctor of Philosophy, University of North Carolina at Chapel Hill, Department of Computer Science, Feb. 1995, 262 pages.

Bimber et al., "Spatial Augmented Reality Merging Real and Virtual Worlds," A K Peters, Ltd. (ed.), 2005, 393 pages.

hitl.washington.edu [online], "Hardware," available on or before Oct. 13, 2005, via Internet Archive: Wayback Machine URL <https://web.archive.org/web/20051013062315/http:/www.hitl.washington.edu:80/artoolkit/documentation/hardware.htm>, retrieved on Mar. 3, 2021, URL <http://www.hitl.washington.edu/artoolkit/documentation/hardware.htm>, 3 pages.

Jacob, "Eye Tracking in Advanced Interface Design," Virtual environments and advanced interface design, 1995, 258:288, 50 pages.

Tanriverdi et al., "Interacting with Eye Movements in Virtual Environments," Proc. of the SIGCHI Conference on Human Factors in Computing Systems, 2000, pp. 265-272.

* cited by examiner

EYEPIECES FOR USE IN WEARABLE DISPLAY SYSTEMS

CROSS-REFERENCE TO RELATED APPLICATIONS

This application is a continuation of U.S. patent application Ser. No. 18/077,030, entitled "Eyepieces for Use in Wearable Display Systems," filed Dec. 7, 2022, now U.S. Pat. No. 11,899,216, which is a continuation of U.S. patent application Ser. No. 17/082,729, entitled "Eyepieces for Use in Wearable Display Systems," filed Oct. 28, 2020, now U.S. Pat. No. 11,543,664, which claims the benefit under 35 U.S.C. § 119(e) of U.S. Patent Application No. 62/928,798, entitled "Eyepieces for Use in Wearable Display Systems," filed Oct. 31, 2019, which are incorporated herein by reference in their entirety.

TECHNICAL FIELD

This disclosure relates to eyepieces for use in wearable display system and methods for producing the same.

BACKGROUND

Optical imaging systems, such as wearable display systems (e.g., wearable display headsets) can include one or more eyepieces that present projected images to a user. Eyepieces can be constructed using thin layers of one or more highly refractive materials. As examples, eyepieces can be constructed from one or more layers of highly refractive glass, silicon, metal, or polymer substrates.

In some cases, an eyepiece can be patterned (e.g., with one or more light diffractive nanostructures) such that it projects an image according to a particular focal depth. For an example, to a user viewing a patterned eyepiece, the projected image can appear to be a particular distance away from the user.

Further, multiple eyepieces can be used in conjunction to project a simulated three-dimensional image. For example, multiple eyepieces—each having a different pattern—can be layered one atop another, and each eyepiece can project a different depth layer of a volumetric image. Thus, the eyepieces can collectively present the volumetric image to the user across three-dimensions. This can be useful, for example, in presenting the user with a "virtual reality" environment.

SUMMARY

This disclosure describes eyepieces for use in wearable display system and methods for producing the same. One or more of the described implementations can be used to efficiently produce wearable display systems exhibiting high optical performance suitable for virtual reality applications (e.g., wide fields of view, high light projection efficiency, uniform image projection characteristics, etc.).

In an aspect, a head-mounted display device includes a light projector and an eyepiece. The eyepiece is arranged to receive light from the light projector and direct the light to a user during use of the wearable display system. The eyepiece includes a waveguide having an edge positioned to receive light from the display light source module and couple the light into the waveguide. The waveguide includes a first surface and a second surface opposite the first surface. In a first region of the waveguide, the second surface defines a plurality of first grating structures. The plurality of first grating structures is configured to diffract light in the first region of the waveguide according to a first set of one or more grating vectors. In a second region of the waveguide different from the first region, the second surface defines a plurality of second grating structures. The plurality of second grating structures is configured to diffract light in the second region of the waveguide according to a second set of one or more grating vectors different from the first set of one or more grating vectors. In a third region of the waveguide different from the first and second regions, the second surface defines a plurality of third grating structures. The plurality of third grating structures is configured to diffract light in the third region of the waveguide according to a third set of one or more grating vectors different from the first set of one or more grating vectors and the second set of one or more grating vectors.

Implementations of this aspect can include one or more of the following features.

In some implementations, the first surface can be an optically smooth surface.

In some implementations, the first surface can be a substantially planar surface.

In some implementations, the first set of one or more grating vectors can include one or more first vectors extending in a first direction. The second set of one or more grating vectors can include one or more second vectors extending in a second direction different from the first direction.

In some implementations, the third set of one or more grating vectors can include one or more third vectors extending in a third direction different from the first direction and the second direction.

In some implementations, the plurality of first grating structures can extend along substantially an entirety of the second surface in the first region.

In some implementations, the plurality of second grating structures can extend along substantially an entirety of the second surface in the second region.

In some implementations, the plurality of third grating structures can extend along substantially an entirety of the second surface in the third region.

In some implementations, the plurality of first grating structures can define a periodic one-dimensional grating having a first grating orientation.

In some implementations, the plurality of second grating structures can define a periodic one-dimensional grating having a second grating orientation different from the first grating orientation.

In some implementations, an angle between the first grating orientation and the second grating orientation can be between 50° and 70°.

In some implementations, a diffraction efficiency of a first subset of the plurality of second grating structures can be less than a diffraction efficiency of a second subset of the plurality of second grating structures. A distance between the first subset of the plurality of second grating structures and the first region can be less than a distance between the second subset of the plurality of second grating structures and the first region.

In some implementations, the plurality of third grating structures can define a periodic two-dimensional grating.

In some implementations, the plurality of third grating structures can include a diamond-shaped lattice.

In some implementations, a diffraction efficiency of the plurality of third grating structures at a first end of the third region can be less than is greater than a diffraction efficiency of the plurality of third grating structures at a second end of the third region opposite the first end of the third region. A distance between the first end of the third region and the first region can be less than a distance between the second end of the third region and the first region.

In some implementations, the first, second, and third regions of the waveguide can be in optical communication with one another.

In some implementations, the first, second, and third regions of the waveguide can be integral with respect to one another.

In some implementations, the second region of the waveguide can at least partially enclose the third region of the waveguide.

In some implementations, the second region of the waveguide can be disposed between the first and second regions of the waveguide.

In some implementations, the waveguide can extend in a first dimension and in a second dimensions orthogonal to the second dimensions. A length of the waveguide in the first dimension can vary along the second dimension.

In some implementations, the waveguide can be configured, during operation of the head-mounted display device, to receive the light at the first region of the waveguide, and project the light from the second surface towards the eye of the user along at least one of the second region of the waveguide or the third region of the waveguide.

In some implementations, the head-mounted display can further include a frame attached to the light projector and the eyepiece. The frame can be configured, when worn by the user, to orient the eyepiece such that the first surface of the waveguide faces the eye of the user.

In another aspect, a method includes forming a waveguide having a first substantially planar surface and a second surface opposite the first surface. Forming the waveguide includes defining a plurality of first grating structures on the second surface along a first region of the waveguide. The plurality of first grating structures are configured to diffract light in the first region of the waveguide according to a first set of one or more grating vector. Forming the waveguide also includes defining a plurality of second grating structures on the second surface along a second region of the waveguide different from the first region. The plurality of second grating structures are configured to diffract light in the second region of the waveguide according to a second set of one or more grating vectors different from the first set of one or more grating vectors. Forming the waveguide also includes defining a plurality of third grating structures on the second surface along a third region of the waveguide different from the first and second regions. The plurality of third grating structures is configured to diffract incident light according to a third set of one or more grating vectors different from the first set of one or more grating vectors and the second set of one or more grating vectors.

Implementations of this aspect can include one or more of the following features.

In some implementations, the waveguide can be integrally formed.

In some implementations, at least one of the plurality of first grating structures, the plurality of second grating structures, or the plurality of third grating structures can be imprinted using one or more lithography processes.

In some implementations, the method can further include installing the waveguide in a head-mounted display device.

In another aspect, a method is performed to provide an image to a user using a head-mounted display. The method includes coupling light into an edge of a waveguide of an eyepiece of the head-mounted display, and diffracting, with a plurality of first grating structures on a surface of the waveguide, at least some of the light in the waveguide according to a first set of one or more grating vectors. The method also includes diffracting, with a plurality of second grating structures on the surface of the waveguide different from the first grating structures, at least some of the light in the waveguide according to a second set of one or more grating vectors. The method also includes diffracting, with a plurality of third grating structures on the surface of the waveguide different from the first and second grating structures, at least some of the light in the waveguide according to a third set of one or more grating vectors. The method also includes extracting at least some of the light diffracted by the first, second, and third grating structures from the waveguide to provide the image to the user.

The details of one or more embodiments are set forth in the accompanying drawings and the description below. Other features and advantages will be apparent from the description and drawings, and from the claims.

DETAILED DESCRIPTION

Figure 1:
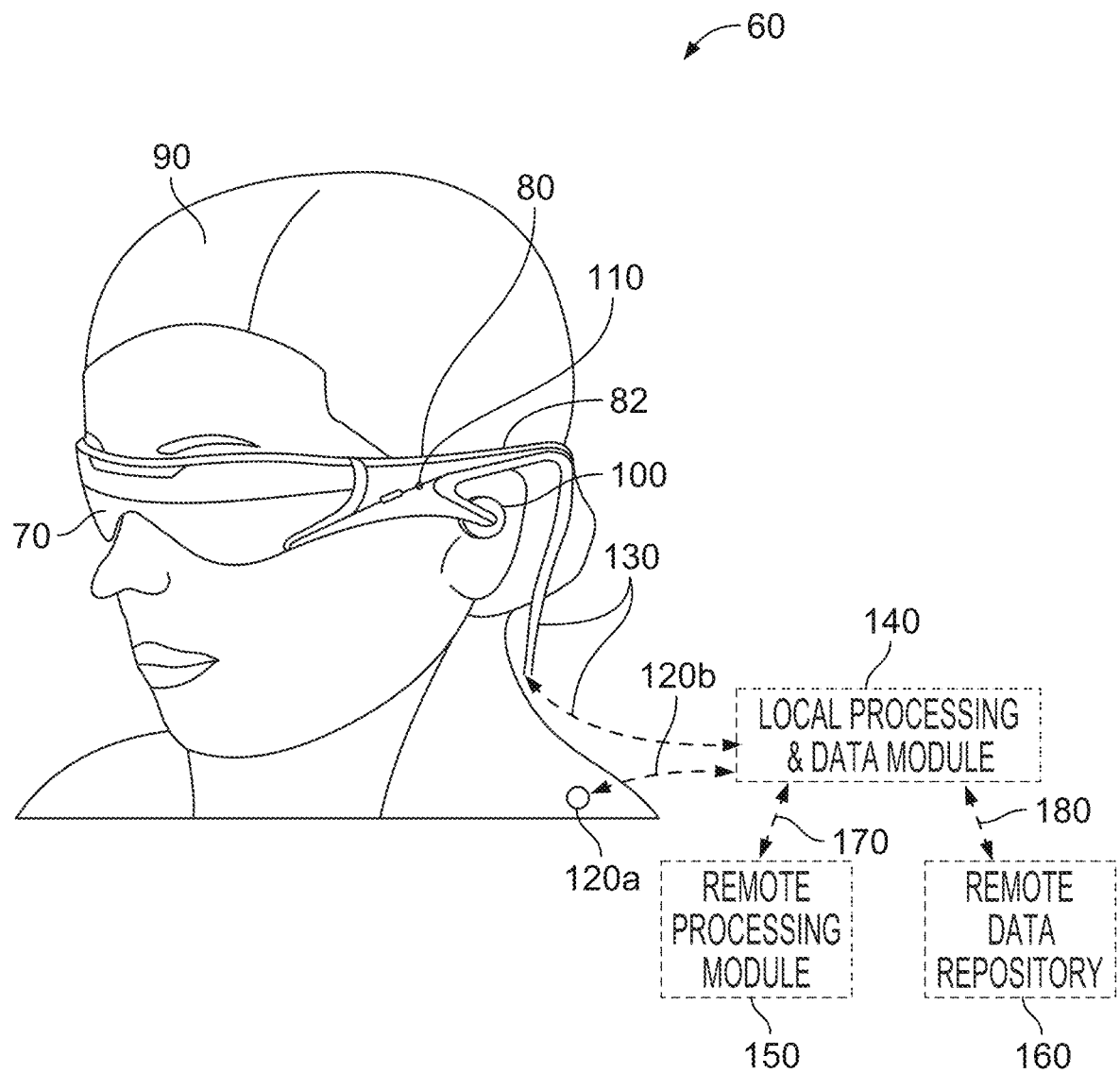
FIG. 1 shows an example of a wearable display system.

FIG. 1 illustrates an example wearable display system 60 that incorporates a one or more of the optical eyepieces described herein. The display system 60 includes a display or eyepiece 70, and various mechanical and electronic modules and systems to support the functioning of that display 70. The display 70 may be coupled to a frame 80, which is wearable by a display system user 90 and which is configured to position the display 70 in front of the eyes of the user 90. The display 70 may be considered eyewear in some embodiments. In some embodiments, a speaker 100 is coupled to the frame 80 and is positioned adjacent the ear canal of the user 90. The display system may also include one or more microphones 110 to detect sound. The microphone 110 can allow the user to provide inputs or commands to the system 60 (e.g., the selection of voice menu commands, natural language questions, etc.), and/or can allow audio communication with other persons (e.g., with other users of similar display systems). The microphone 110 can also collect audio data from the user's surroundings (e.g., sounds from the user and/or environment). In some embodiments, the display system may also include a peripheral sensor 120 a, which may be separate from the frame 80 and attached to the body of the user 90 (e.g., on the head, torso, an extremity, etc.). The peripheral sensor 120 a may acquire data characterizing the physiological state of the user 90 in some embodiments.

The display 70 is operatively coupled by a communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or removably attached to the user 90 (e.g., in a backpack-style configuration or in a belt-coupling style configuration). Similarly, the sensor 120 a may be operatively coupled by communications link 120 b (e.g., a wired lead or wireless connectivity) to the local processor and data module 140. The local processing and data module 140 may include a hardware processor, as well as digital memory, such as non-volatile memory (e.g., flash memory or a hard disk drive), both of which may be utilized to assist in the processing, caching, and storage of data. The data may include data 1) captured from sensors (which may be, e.g., operatively coupled to the frame 80 or otherwise attached to the user 90), such as image capture devices (e.g., cameras), microphones, inertial measurement units, accelerometers, compasses, GPS units, radio devices, gyros, and/or other sensors disclosed herein; and/or 2) acquired and/or processed using a remote processing module 150 and/or a remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and the remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone devices that communicate with the local processing and data module 140 by wired or wireless communication pathways.

The remote processing module 150 may include one or more processors to analyze and process data, such as image and audio information. In some embodiments, the remote data repository 160 may be a digital data storage facility, which may be available through the internet or other networking configuration in a "cloud" resource configuration. In some embodiments, the remote data repository 160 may include one or more remote servers, which provide information (e.g., information for generating augmented reality content) to the local processing and data module 140 and/or the remote processing module 150. In other embodiments, all data is stored and all computations are performed in the local processing and data module, allowing fully autonomous use from a remote module.

Figure 2A:
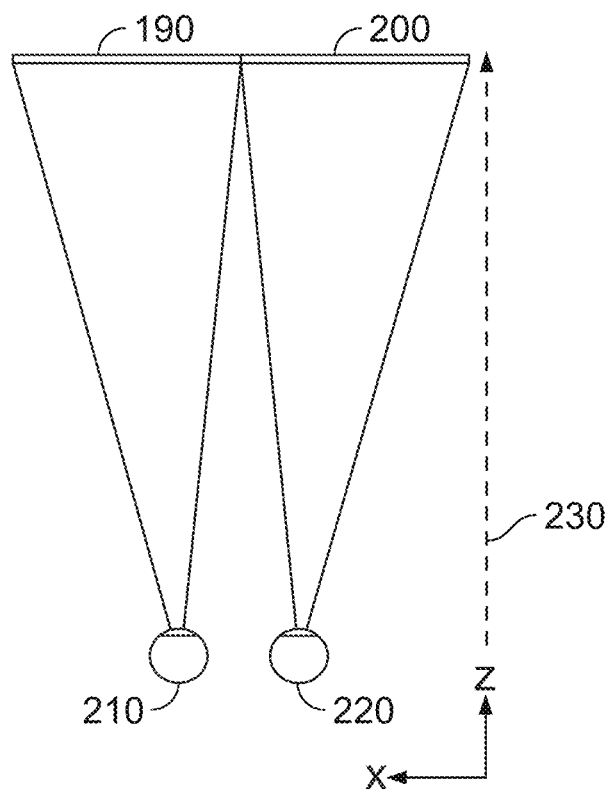
FIG. 2A shows a conventional display system for simulating three-dimensional image data for a user.

The perception of an image as being "three-dimensional" or "3-D" may be achieved by providing slightly different presentations of the image to each eye of the user. FIG. 2A illustrates a conventional display system for simulating three-dimensional image data for a user. Two distinct images 190, 200—one for each eye 210, 220—are output to the user. The images 190, 200 are spaced from the eyes 210, 220 by a distance 230 along an optical or z-axis that is parallel to the line of sight of the user. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

However, the human visual system is complicated and providing a realistic perception of depth is challenging. For example, many users of conventional "3-D" display systems find such systems to be uncomfortable or may not perceive a sense of depth at all. Objects may be perceived as being "three-dimensional" due to a combination of vergence and accommodation. Vergence movements (e.g., rotation of the eyes so that the pupils move toward or away from each other to converge the respective lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, under normal conditions, a change in vergence will trigger a matching change in accommodation of lens shape and pupil size. As noted herein, many stereoscopic or "3-D" display systems display a scene using slightly different presentations (and, so, slightly different images) to each eye such that a three-dimensional perspective is perceived by the human visual system. Such systems can be uncomfortable for some users, however, since they simply provide image information at a single accommodated state and work against the "accommodation-vergence reflex." Display systems that provide a better match between accommodation and vergence may form more realistic and comfortable simulations of three-dimensional image data.

Figure 2B:
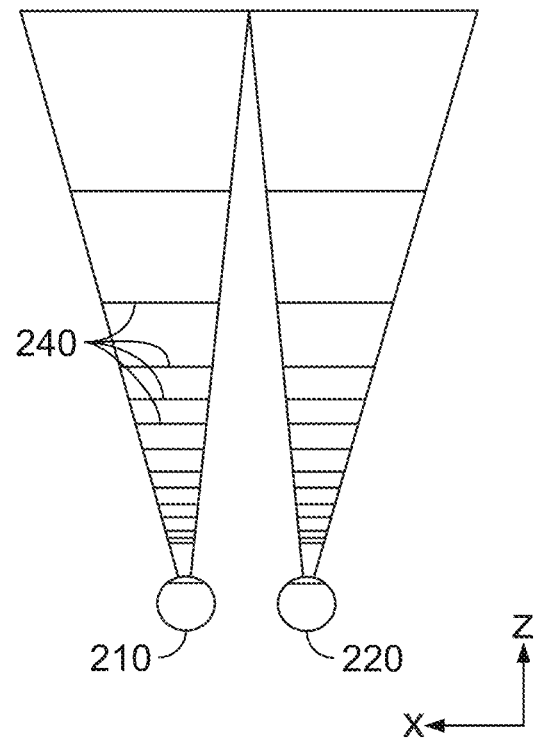
FIG. 2B shows aspects of an approach for simulating three-dimensional image data using multiple depth planes.

FIG. 2B illustrates aspects of an approach for simulating three-dimensional image data using multiple depth planes. With reference to FIG. 2B, the eyes 210, 220 assume different accommodated states to focus on objects at various distances on the z-axis. Consequently, a particular accommodated state may be said to be associated with a particular one of the illustrated depth planes 240, which has an associated focal distance, such that objects or parts of objects in a particular depth plane are in focus when the eye is in the accommodated state for that depth plane. In some embodiments, three-dimensional image data may be simulated by providing different presentations of an image for each of the eyes 210, 220, and also by providing different presentations of the image corresponding to multiple depth planes. While the respective fields of view of the eyes 210, 220 are shown as being separate for clarity of illustration, they may overlap, for example, as distance along the z-axis increases. In addition, while the depth planes are shown as being flat for ease of illustration, it will be appreciated that the contours of a depth plane may be curved in physical space, such that all features in a depth plane are in focus with the eye in a particular accommodated state.

Figure 3A:
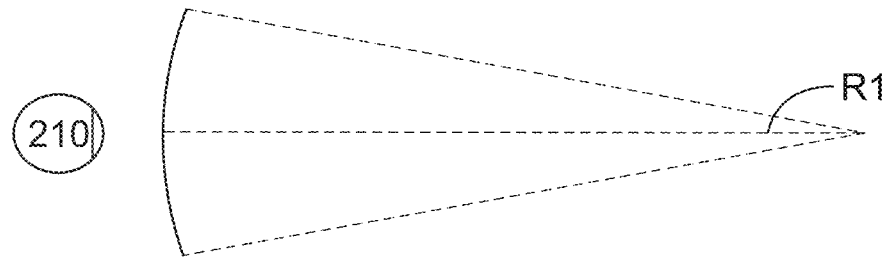
FIGS. 3A-3C show relationships between radius of curvature and focal radius.
Figure 3B:
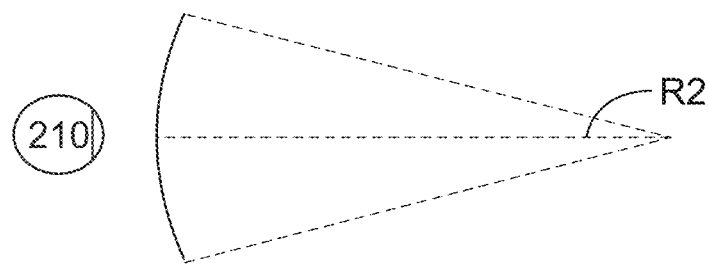
Figure 3C:
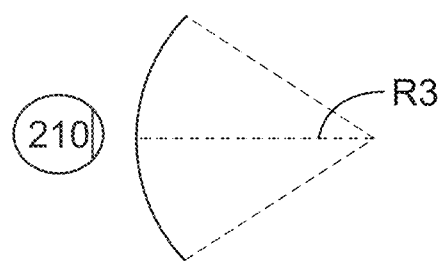

The distance between an object and an eye 210 or 220 may also change the amount of divergence of light from that object, as viewed by that eye. FIGS. 3A-3C illustrate relationships between distance and the divergence of light rays. The distance between the object and the eye 210 is represented by, in order of decreasing distance, R1, R2, and R3.

As shown in FIGS. 3A-3C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the user's eye 210. While only a single eye 210 is illustrated for clarity of illustration in FIGS. 3A-3C and other figures herein, it will be appreciated that the discussions regarding the eye 210 may be applied to both eyes 210 and 220 of a user.

A highly believable simulation of perceived depth may be achieved by providing, to the eye, different presentations of an image corresponding to each of a limited number of depth planes. The different presentations may be separately focused by the user's eye, thereby helping to provide the user with depth cues based on the amount of accommodation of the eye required to bring into focus different image features for the scene located on different depth planes and/or based on observing different image features on different depth planes being out of focus.

Figure 4:
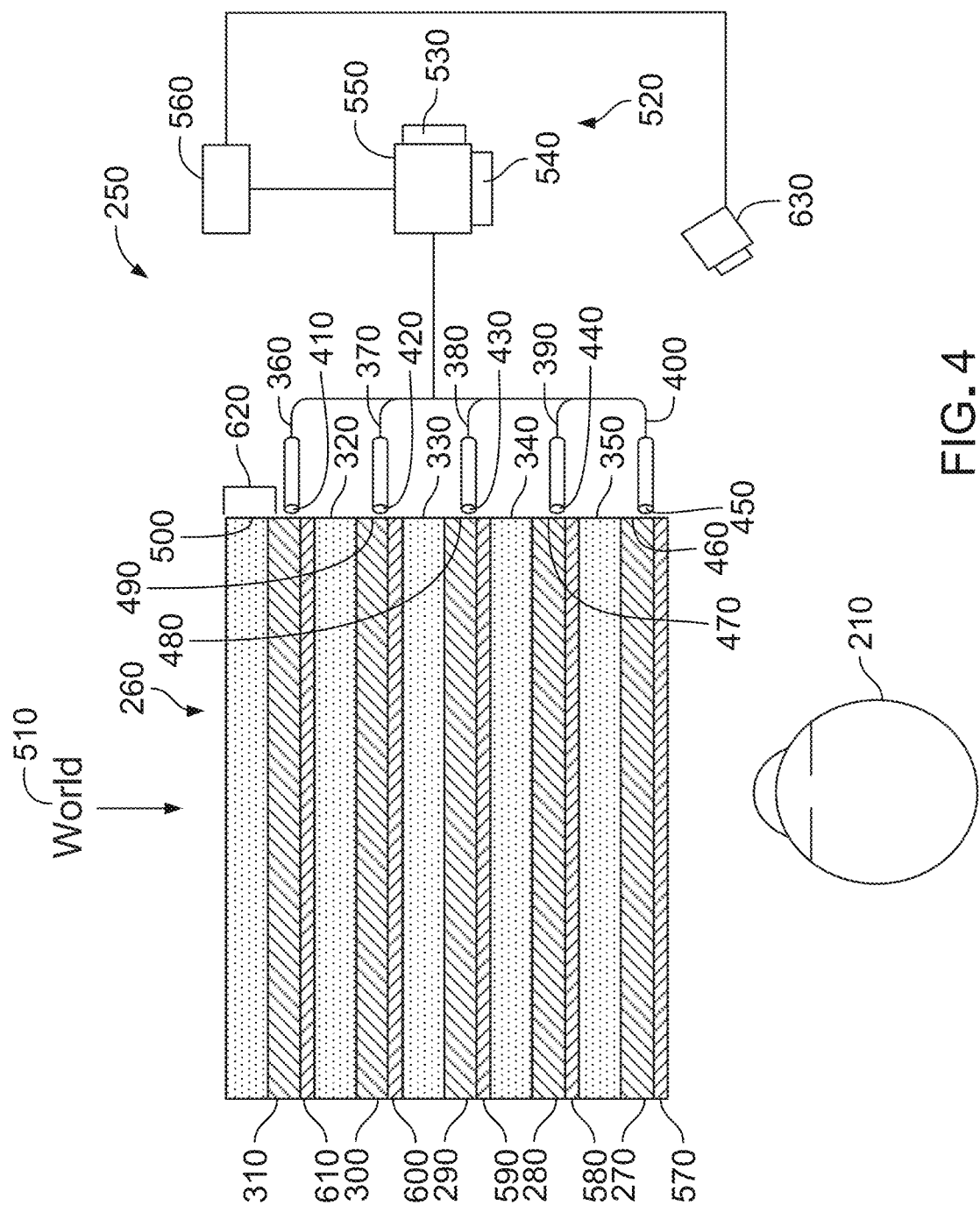
FIG. 4 shows an example of a waveguide stack for outputting image information to a user in an AR eyepiece.

FIG. 4 illustrates an example of a waveguide stack for outputting image information to a user in an AR eyepiece. A display system 250 includes a stack of waveguides, or stacked waveguide assembly, 260 that may be utilized to provide three-dimensional perception to the eye/brain using a plurality of waveguides 270, 280, 290, 300, 310. In some embodiments, the display system 250 is the system 60 of FIG. 1, with FIG. 4 schematically showing some parts of that system 60 in greater detail. For example, the waveguide assembly 260 may be part of the display 70 of FIG. 1. It will be appreciated that the display system 250 may be considered a light field display in some embodiments.

The waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of each respective image injection device 360, 370, 380, 390, 400 and is injected into a corresponding input surface 460, 470, 480, 490, 500 of the respective waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the user's eye 210). In some embodiments, a beam of light (e.g., a collimated beam) may be injected into each waveguide and may be replicated, such as by sampling into beamlets by diffraction, in the waveguide and then directed toward the eye 210 with an amount of optical power corresponding to the depth plane associated with that particular waveguide. In some embodiments, a single one of the image injection devices 360, 370, 380, 390, 400 may be associated with, and inject light into, a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may transmit image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors.

In some embodiments, the light injected into the waveguides 270, 280, 290, 300, 310 is provided by a light projector system 520, which includes a light module 530, which may include a light source or light emitter, such as a light emitting diode (LED). The light from the light module 530 may be directed to, and modulated by, a light modulator 540 (e.g., a spatial light modulator), via a beamsplitter (BS) 550. The light modulator 540 may spatially and/or temporally change the perceived intensity of the light injected into the waveguides 270, 280, 290, 300, 310. Examples of spatial light modulators include liquid crystal displays (LCD), including a liquid crystal on silicon (LCOS) displays, and digital light processing (DLP) displays.

In some embodiments, the light projector system 520, or one or more components thereof, may be attached to the frame 80 (FIG. 1). For example, the light projector system 520 may be part of a temporal portion (e.g., ear stem 82) of the frame 80 or disposed at an edge of the display 70. In some embodiments, the light module 530 may be separate from the BS 550 and/or light modulator 540.

In some embodiments, the display system 250 may be a scanning fiber display comprising one or more scanning fibers to project light in various patterns (e.g., raster scan, spiral scan, Lissajous patterns, etc.) into one or more waveguides 270, 280, 290, 300, 310 and ultimately into the eye 210 of the user. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. One or more optical fibers may transmit light from the light module 530 to the one or more waveguides 270, 280, 290, 300, and 310. In addition, one or more intervening optical structures may be provided between the scanning fiber, or fibers, and the one or more waveguides 270, 280, 290, 300, 310 to, for example, redirect light exiting the scanning fiber into the one or more waveguides 270, 280, 290, 300, 310.

A controller 560 controls the operation of the stacked waveguide assembly 260, including operation of the image injection devices 360, 370, 380, 390, 400, the light source 530, and the light modulator 540. In some embodiments, the controller 560 is part of the local data processing module 140. The controller 560 includes programing (e.g., instructions in a non-transitory medium) that regulates the timing and provision of image information to the waveguides 270,

280, 290, 300, 310. In some embodiments, the controller may be a single integral device, or a distributed system connected by wired or wireless communication channels. The controller 560 may be part of the processing modules 140 or 150 (FIG. 1) in some embodiments.

The waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be output by the waveguide at locations at which the light propagating in the waveguide strikes a light extracting optical element. The out-coupling optical elements 570, 580, 590, 600, 610 may be, for example, diffractive optical features, including diffractive gratings, as discussed further herein. While the out-coupling optical elements 570, 580, 590, 600, 610 are illustrated as being disposed at the bottom major surfaces of the waveguides 270, 280, 290, 300, 310, in some embodiments they may be disposed at the top and/or bottom major surfaces, and/or may be disposed directly in the volume of the waveguides 270, 280, 290, 300, 310. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

Each waveguide 270, 280, 290, 300, 310 may output light to form an image corresponding to a particular depth plane. For example, the waveguide 270 nearest the eye may deliver collimated beams of light to the eye 210. The collimated beams of light may be representative of the optical infinity focal plane. The next waveguide up 280 may output collimated beams of light which pass through the first lens 350 (e.g., a negative lens) before reaching the eye 210. The first lens 350 may add a slight convex wavefront curvature to the collimated beams so that the eye/brain interprets light coming from that waveguide 280 as originating from a first focal plane closer inward toward the eye 210 from optical infinity. Similarly, the third waveguide 290 passes its output light through both the first lens 350 and the second lens 340 before reaching the eye 210. The combined optical power of the first lens 350 and the second lens 340 may add another incremental amount of wavefront curvature so that the eye/brain interprets light coming from the third waveguide 290 as originating from a second focal plane that is even closer inward from optical infinity than was light from the second waveguide 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate optical power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may output images set to the same depth plane, or multiple subsets of the waveguides 270, 280, 290, 300, 310 may output images set to the same plurality of depth planes, with one set for each depth plane. This can provide advantages for forming a tiled image to provide an expanded field of view at those depth planes.

The out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive features with a diffractive efficiency sufficiently low such that only a portion of the power of the light in a beam is re-directed toward the eye 210 with each interaction, while the rest continues to move through a waveguide via TIR. Accordingly, the exit pupil of the light module 530 is replicated across the waveguide to create a plurality of output beams carrying the image information from light source 530, effectively expanding the number of locations where the eye 210 may intercept the replicated light source exit pupil. These diffractive features may also have a variable diffractive efficiency across their geometry to improve uniformity of light output by the waveguide.

In some embodiments, one or more diffractive features may be switchable between "on" states in which they actively diffract, and "off" states in which they do not significantly diffract. For instance, a switchable diffractive element may include a layer of polymer dispersed liquid crystal in which microdroplets form a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and IR light cameras) may be provided to capture images of the eye 210, parts of the eye 210, or at least a portion of the tissue surrounding the eye 210 to, for example, detect user inputs, extract biometric information from the eye, estimate and track the gaze direction of the eye, to monitor the physiological state of the user, etc. In some embodiments, the camera assembly 630 may include an image capture device and a light source to project light (e.g., IR or near-IR light) to the eye, which may then be reflected by the eye and detected by the image capture device. In some embodiments, the light source includes light emitting diodes ("LEDs"), emitting in IR or near-IR. In some embodiments, the camera assembly 630 may be attached to the frame 80 (FIG. 1) and may be in electrical communication with the processing modules 140 or 150, which may process image information from the camera assembly 630 to make various determinations regarding, for example, the physiological state of the user, the gaze direction of the wearer, iris identification, etc. In some embodiments, one camera assembly 630 may be utilized for each eye, to separately monitor each eye.

Figure 5:
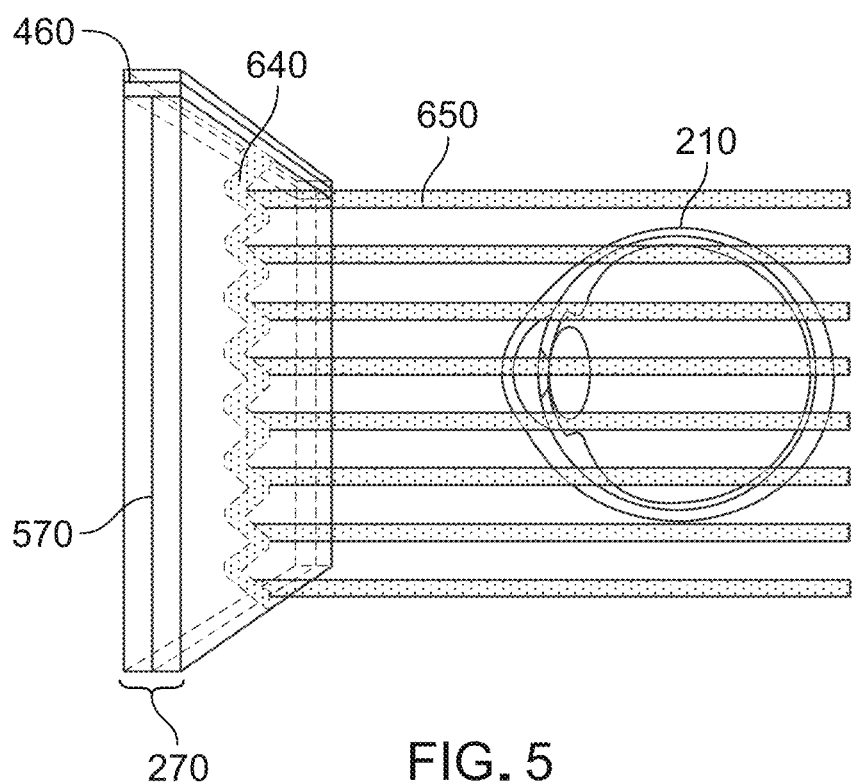
FIGS. 5 and 6 show examples of exit beams outputted by a waveguide.
Figure 6:
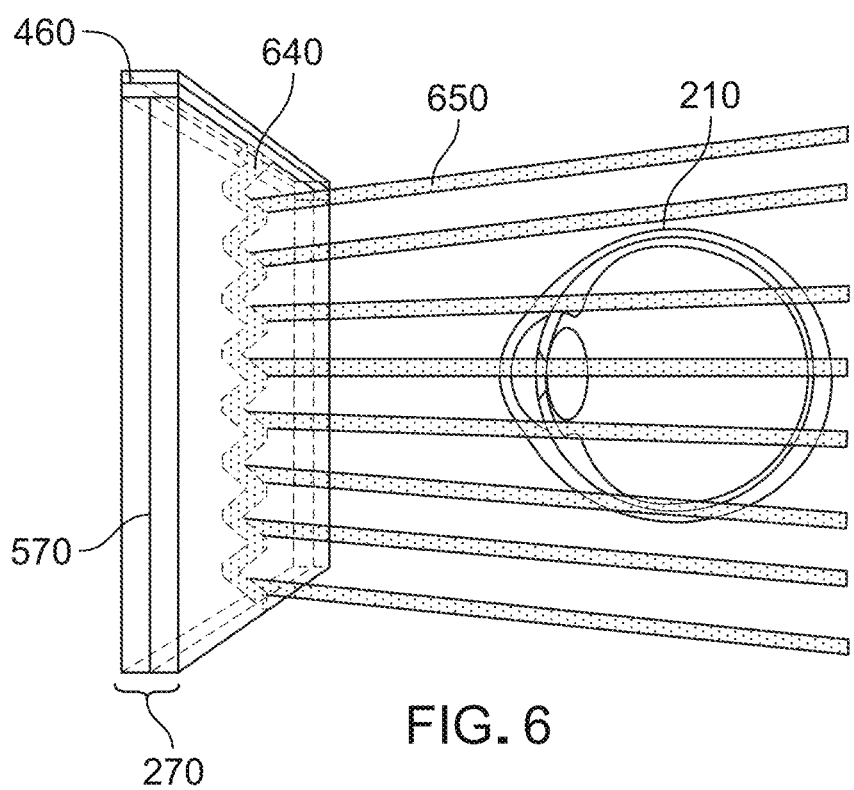

FIG. 5 illustrates an example of exit beams output by a waveguide. One waveguide is illustrated (with a perspective view), but other waveguides in the waveguide assembly 260 (FIG. 4) may function similarly. Light 640 is injected into the waveguide 270 at the input surface 460 of the waveguide 270 and propagates within the waveguide 270 by TIR. Through interaction with diffractive features, light exits the waveguide as exit beams 650. The exit beams 650 replicate the exit pupil from a projector device which projects images into the waveguide. Any one of the exit beams 650 includes a sub-portion of the total energy of the input light 640. And in a perfectly efficient system, the summation of the energy in all the exit beams 650 would equal the energy of the input light 640. The exit beams 650 are illustrated as being substantially parallel in FIG. 6 but, as discussed herein, some amount of optical power may be imparted depending on the depth plane associated with the waveguide 270. Parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, as shown in FIG. 6, which would require the eye 210 to accommodate to a closer distance to bring it into focus on the retina and would be interpreted by the brain as light from a distance closer to the eye 210 than optical infinity.

Additional information regarding wearable display systems (e.g., including optical elements used in wearable display systems) can be found in U.S. patent application Ser. No. 16/221,359, filed Dec. 14, 2018, and entitled "EYE-PIECES FOR AUGMENTED REALITY DISPLAY SYSTEM," the contents of which are incorporated by reference in their entirety.

The wearable display system 60 can include one or more optical elements (e.g., waveguides), each of which has multiple different types of grating structures that govern the manner in which light in-couples into the optical element, propagates through the optical element, and out-couples from the optical element. Further, the grating structures can be defined on a single surface of the optical element (e.g., the surface of the optical element that faces the user's eye when the wearable display system 60 is worn by the user). This is beneficial, for example, as it enables the optical element to be produced more easily (e.g., compared to an optical element having grating structures defined on multiple different surfaces).

As an example, an eyepiece of the wearable display system 60 can be formed by one or more one or more optical elements, such as the waveguide stack shown in FIG. 4. Further, at least one of the optical elements can include multiple types of grating structures defined along its periphery (e.g., along an interface between an optical element and another optical element, or along an interface between an optical element and air, such as out-coupling optical elements 570, 580, 590, 600, 610). In particular, an optical element can include multiple different regions, each region having a different respective type of grating structure defined on its surface. Each type of grating structure can cause light to in-couple into, propagate through, and/or out-couple from the optical element in a different manner. Further, these regions can be spatially arranged such that light in-couples into the optical element, propagates through the optical element, and out-couples from the optical element to achieve a particular optical effect (e.g., to facilitate projection of three-dimensional images to a user of the wearable display system 60).

Figure 7:
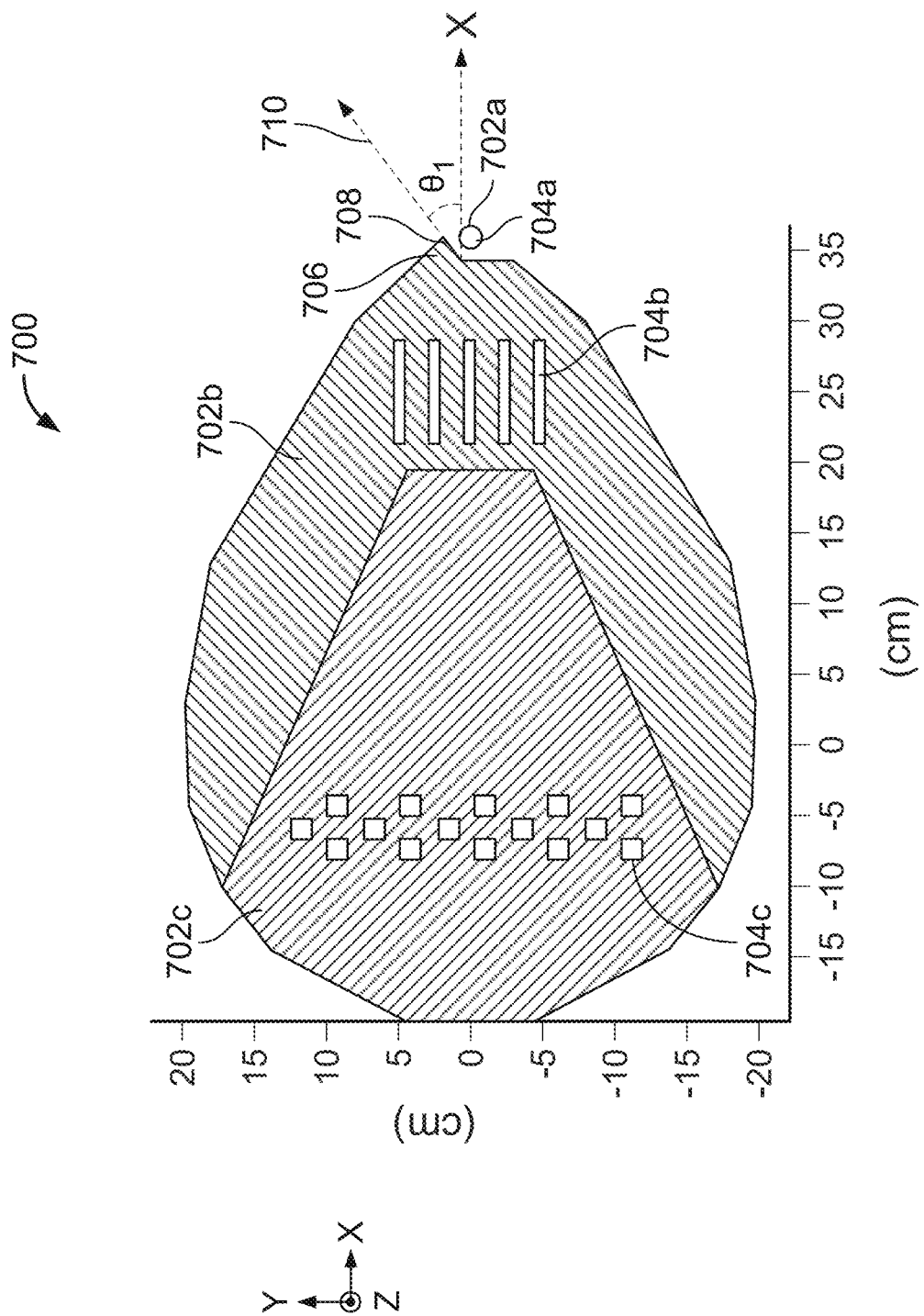
FIG. 7 shows an example optical element.

FIG. 7 shows a plan view of an example optical element 700. The optical element 700 can be used to form an eyepiece of the wearable display system 60. For example, one or more of the optical elements 700 can used to form the waveguide stack shown in FIG. 4. In some implementations, the optical element 700 can be arranged such that the z-direction faces the user's eye when the wearable display system 60 is worn by the user.

The optical element 700 includes three regions 702a-702c, each having a different respective type of grating structure 704a-704c defined along its surface (e.g., the surface facing in the z-direction). The surface opposite the surface having the grating structures can be optically smooth and/or substantially planar. In practice, the shape of the optical element 700 can vary. For example, as shown in FIG. 7, the optical element 700 can have a teardrop shape.

For ease of illustration, FIG. 7 shows the grating structures 704a-704c as extending along a portion of the surface of their respective regions 702a-702c. However, in practice, one or more of the grating structures 704a-704c can be defined along an entirety or substantially an entirety of the surface of their respective regions 702a-702c. For example, the grating structures 704a can extend along an entirety or substantially an entirety of the surface of the region 702a. As another example, the grating structures 704b can extend along an entirety or substantially an entirety of the surface of the region 702b. As another example, the grating structures 704c can extend along an entirety or substantially an entirety of the surface of the region 702b. Further, for ease of illustration, the grating structures 704a-704c are not necessarily drawn to scale. In practice, the dimension of each gating structures 704a-704c can differ, depending on the implementation. Additionally, each of grating structures 704a-704c can vary in pitch, height, material, or other characteristics within their respective regions 702a-702c as a function of position on the optical element 700. For example, features of grating structures 702b or 702c may increase in height as distance from region 704a increases.

The first region 702a is positioned on the periphery of the optical element 700 (e.g., furthest along the x-direction). The second region 702b is positioned adjacent to the first region 702a, and includes a protrusion 706 at its interface with the first region 702a. As shown in FIG. 7, the protrusion 706 is defined, at its periphery, by a planar edge 708 extending in a direction 710 along the x-y plane. The direction 710 is angled relative to the x-axis by an angle $\theta_1$. In some implementations, the angle $\theta_1$ can be 30° or approximately 30° (e.g., 30°±10°). In some implementations, the protrusion 706 can be omitted.

The second region 702b at least partially encloses the third region 702c. For example, as shown in FIG. 7, the second region 702b increases in width (e.g., in the y-direction) as it extends in a direction away from the first region 702a (e.g., in the −x-direction), and defines a concave shape (e.g., a reverse C-shape) that partially encloses the third region 702c. Further, the third region 702c initially gradually increases in width (e.g., in the y-direction) as it extends in a direction away from the first region 702a (e.g., in the −x-direction), then gradually decreases in width towards the periphery of the optical element 700 opposite the first region 702a.

In some implementations, the first region 702a, the second region 702b, and the third region 702c can be integrally formed with one another (e.g., forming a single monolithic piece). In some implementations, at least one of the first region 702a, the second region 702b, or the third region 702c can be formed separately from the other regions and secured to the other regions (e.g., during a manufacturing process).

In general, a first region 702a is configured to in-couple light into the optical element 700 and propagate the light to the second region 702b and/or the third region 702c. The second region 702b and 702c are configured to cause at least some light to propagate through the optical element 700 and cause at least some light to out-couple from the optical element 700. In some implementations, the first region 702a may be referred to as an "input coupling grating" (ICG), and the second region 702b and/or the third region 702b may be referred to as "orthogonal pupil expanders" (OPEs) and/or "exit pupil expanders" (EPEs).

In an example usage of the optical element 700, light is injected into the first region 702a (e.g., using a light source, such as one or more of the image injection devices 360, 370, 380, 390, 400). At least some of the injected light is diffracted by grating structure 704a and propagates internally by totally internal reflection (TIR) within the optical element 700 from the first region 702a into the second region 702b (e.g., in the x and/or y-directions).

Further, at least some of the light propagates internally within the optical element 700 along the second region 702b (e.g., orthogonally "expanding" the spatial distribution of light within the optical element 700). At least some of the light within the second region 702b propagates internally within the optical element 700 (e.g., in the x-direction and/or y-direction) into the third region 702c.

Similarly, at least some of the light propagates internally within the optical element 700 along the third region 702c (e.g., orthogonally "expanding" the spatial distribution of light within the optical element 700). Further, at least some of the light within the third region 702c is out-coupled from the optical element 700 along the third region 702c (e.g., exiting the optical element 700 in the z-direction towards the user's eye). Further, at least some of the light within the third region 702c propagates internally within the optical element 700 (e.g., in the x-direction and/or y-direction) back into the second region 702b. Further, at least some of the light re-entering the second region 702b is out-coupled from the optical element 700 along the second region 702b (e.g., exiting the optical element 700 in the z-direction towards the user's eye).

Figure 8C:
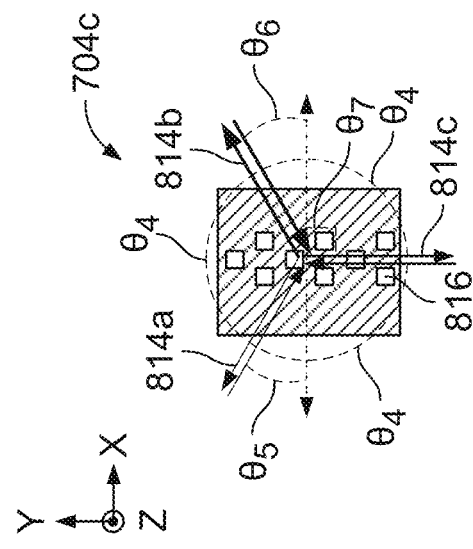
FIGS. 8A-8C show example grating structures.
Figure 8B:
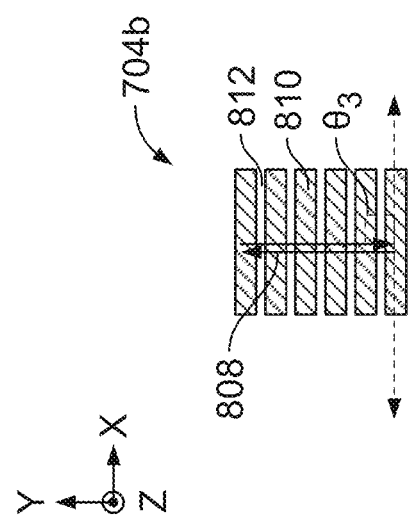
Figure 8A:
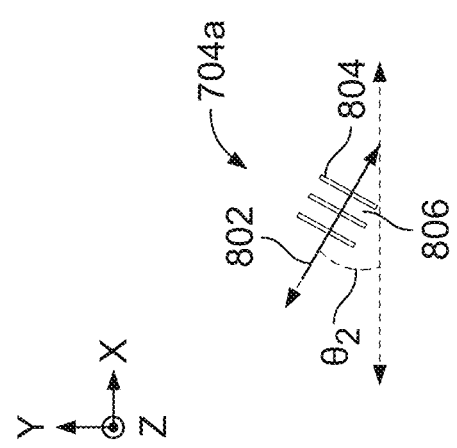

The regions 702a-702c and their respective grating structures 704a-704c can be configured such that light out-couples from the optical element 700 in a specific manner, such as to achieve a particular optical effect (e.g., to facilitate projection of images to a user). For instance, FIGS. 8A-8C show example configurations of the grating structures 704a-704c, respectively. The grating structures 704a-704c can be defined on a surface of the optical element 700 (e.g., the surface that faces away from the user's eye when the wearable display system 60 is worn by the user) along a portion of or an entirety of each respectively region 702a-702c. In alternative embodiments, the grating structures 704a-704c can be defined on the surface of the optical element 700 that is nearer to the user's eye.

As shown in FIG. 8A, the grating structures 704a are arranged such that they define a grating vector 802. As an example, the grating structures 704a can be configured as a one-dimensional binary grating having a number of periodically repeating protrusions 804 (e.g., protruding from the optical element 700 in the z-direction), separated from one another by a number of periodically repeating troughs 806 (e.g., recessing into the optical element 700 in the z-direction). The grating structures 704a repeat periodically along the grating vector 802, with each protrusion 804 and trough 806 extending lengthwise in a direction perpendicular to the grating vector 802. Further, the grating vector 802 is angled relative to the x-axis by an angle $\theta_2$. In some implementations, the angle $\theta_2$ can be 30° or approximately 30° (e.g., 30°±15°). Other angles are also possible depending on the desired relative size, shape, and location of the various regions 702a-702c.

In some implementations, some or all of the grating structures 704a can be blazed gratings. For example, the grating structures 704a can be formed lithographically by applying an imprinted resist material onto the optical element 700 and/or etching the optical element 700 according to a particular blazing angle with respect to the surface of the optical element 700. Further, some or all of the grating structures 704a can be metalized (e.g., coated with a metallic material) to increase the amount of light that is in-coupled into the optical element 700.

In some implementations, the grating structures 704a can have a grating pitch (e.g., a period) of 349 nm or approximately 349 nm (e.g., 349 nm±5 nm, 349 nm±10 nm, or some other range). The pitch can be adjusted depending on the wavelength(s) of light desired to be in-coupled into the optical element 700. Further, in some implementations, the grating structures 704a can have a duty cycle (e.g., a ratio of the width of each protrusion in the direction of the grating vector 802 to the period of the grating structures) of 50%±10%. In some embodiments, the duty cycle can be zero or approximately zero (e.g., for blazed gratings).

As shown in FIG. 8B, the grating structures 704b are arranged such that they define grating vectors 808 (e.g., a pair of anti-parallel vectors). As an example, the grating structures 704b can be configured as a one-dimensional binary grating having a number of periodically repeating protrusions 810 (e.g., protruding from the optical element 700 in the z-direction), separated from one another by a number of periodically repeating troughs 812 (e.g., recessing into the optical element 700 in the z-direction). The grating structures 704b repeat periodically along the grating vectors 808, with each protrusion 810 and trough 812 extending lengthwise in a direction perpendicular to the grating vectors 808. Further, the grating vector 808 is angled relative to the x-axis by an angle $\theta_3$. In some implementations, the angle $\theta_3$ can be 90° or approximately 90° (e.g., 90°±10°). The grating vectors 808 also can be defined relative to the angle $\theta_2$, the angle $\theta_3$, and the angle $\theta_6$, where the sum of angles $\theta_2$, $\theta_3$, and $\theta_6$ is zero.

In some implementations, some or all of the grating structures 704b also can be blazed gratings. For example, the grating structures 704b can be formed lithographically by applying an imprinted resist material onto the optical element 700 and/or etching the optical element 700 according to a particular blazing angle with respect to the surface of the optical element 700. Further, some or all of the grating structures 704b can be metalized (e.g., coated with a metallic material).

In some implementations, the grating structures 704b can have a grating pitch (e.g., a period) of 360 nm or approximately 360 nm (e.g., 360 nm±5 nm, 360 nm±10 nm, or some other range). In some implementations, the grating structures 704b can have a duty cycle (e.g., a ratio of the width of each protrusion in the direction of the grating vector 808 to the period of the grating structures) of 50% or approximately 50% (e.g., 50%±15%).

As shown in FIG. 8C, the grating structures 704c are arranged such that they define three pairs of anti-parallel vectors 814a-814c). As an example, the grating structures 704c can be configured as a two-dimensional grating having a number of periodically repeating structures 816 (e.g., either holes that recess into the optical element 700 in the z-direction, or protrusions that extend away from the optical element 700 in the z-direction). The grating structures 704c repeat periodically according to a two-dimension lattice (e.g., a diamond-shaped lattice). For example, the grating structures 704c can include rows of periodically repeating structures 816 (e.g., either holes or protrusions), with each row extending in the x-direction. Adjacent rows can be offset from one another, such that the structures 816 of one row are positioned between the structures 816 of its adjacent rows with respect to the x-direction (e.g., a 50% offset).

The shape and dimensions of the structures 816 can vary, depending on the implementation. As an example, some or all of the structures 816 can be square-shaped, circle-shaped, diamond-shaped, rectangle-shaped, or have other shape. In some implementations, different shapes can be used concurrently (e.g., alternating patterns of square shaped holes and rectangle-shaped holes). In some implementations, holes and protrusions can be used concurrently (e.g., alternating patterns of holes and protrusions). In some implementations, the dimensions of the structures 816 can be square having a width of 175 nm±15 nm.

As shown in FIG. 8C, the three pairs of anti-parallel vectors 814a-814c are angularly offset relative to one another by an angle $\theta_4$ (e.g., 120° or approximately 120°). Further, a first pair of anti-parallel vectors 814a is angled relative to the x-axis by an angle $\theta_5$, a second pair of anti-parallel vectors 814b is angled relative to the x-axis by an angle $\theta_6$, and a third pair of anti-parallel vectors 814c is angled relative to the x-axis by an angle $\theta_7$. In some implementations, the angles $\theta_5$ and $\theta_6$ can be equal to or similar to the angle $\theta_2$ (e.g., 30° or approximately 30°). In some implementations, the angle $\theta_7$ can be 90° or approximately 90°.

In some implementations, the grating structures 704c can be formed lithographically by applying an imprinted resist material onto the optical element 700 and/or and etching the optical element 700 according to form holes and/or protrusions.

In some implementations, the grating structures 704c can have a different or the same grating pitch with respect to different directions. For example, in the x direction, the grating structures 704c can have a grating pitch (e.g., a period) of 200 nm or approximately 250 nm (e.g., 250 nm±5 nm, 250 nm±10 nm, or some other range) between adjacent structures. Further, in the y-direction, the grating structures 704c can have a grating pitch of 360 nm or approximately 360 nm (e.g., 360 nm±5 nm, 360 nm±10 nm, or some other range) between adjacent structures. In some implementations, the grating pitch of the grating structures 704c can be defined according to two vectors (e.g., x and y vectors) specifying the orientation of the grating in two dimensions. For example, in some implementations, the grating structure 704c can be defined according to an x vector of 200 nm and a y vector of 360 nm (e.g., the vector set (200 nm, −360 nm)). In some implementations, the grating pitch of the grating structures 704c can be similar to that of the grating structures 704b, but offset by a particular angle (e.g., 60°). In some implementations, the grating structures 704c can have a duty cycle of 50% or approximately 50% (e.g., 50%±15%).

The optical element 700 can be formed from one or more materials. As an example, the optical element 700 can be formed from a substrate material having a refractive index n>1.75 or n>1.8. This can be useful, for example, facilitating the projection of images according to a wide field of view (e.g., 45°×55°). In some implementations, the optical element 700 can be formed from a substrate material having a refractive index 1.8<n<2.0. Optical elements formed using these types of substrate materials are suitable for projecting images according to a single color. In some implementations, the optical element 700 can be formed from a substrate material having a refractive index n>2.3 (e.g., $LiNbO_3$ or SiC). Optical elements formed using these types of substrate materials are suitable for projecting images according to multiple colors concurrently (e.g., red, green, and blue).

In some implementations, the grating structures 704a-704c can be formed by directly etching the optical element 700 (e.g., to remove material from the optical element 700). In some implementations, the grating structures 704a-704c can be formed by depositing material onto the optical element 700. For example, grating structures 704a-704c can be formed by depositing onto the optical element 700 a resist material having a different refractive index than the optical element 700 (e.g., material having a refractive index n between 1.5 and 1.7.

In practice, the dimensions of the optical element 700 can vary, depending on the implementation. As an example, as shown in FIG. 7, the optical element 700 can have a length of approximately 50 cm in the x-direction, and a width of approximately 40 cm in the y-direction. Further, the optical element 700 can have a thickness (e.g., in the z-direction) between 325 μm and 1 mm. In other examples, the optical element can be have a different length, width, and/or thickness, depending on the application.

Further, the configuration of the optical element 700 and its grating structures can vary based on the wavelength of light that it is intended to project. For example, for an optical element 700 that is configured to project images using green light (e.g., light having a wavelength λ of 525 nm), the optical element 700 can be formed using a material having a refraction index n of 2.0, and a thickness of 500 μm (e.g., in the z-direction). Further, the optical element 700 can be formed lithographically using a resist material having a refraction index n of 1.8, 1.65, or 1.53. Further, the first region 702a can have a diameter of 1.5 mm, and have grating structures with a pitch of 349 nm and a duty cycle of 0.5 (50%) or less. Further, the second region 702b can have grating structures with a pitch of 360 nm and a duty cycle of 0.5 (50%). Further, the third region 702c have grating structures with square-shaped holes having a length of 175 nm, and a pitch of 200 nm between holes in the x-direction and 360 nm between holes in the y-direction. Although an example configuration is described herein, this is merely an illustrative example. In practice, other dimensions are also possible, depending on the application.

The arrangement of the regions 702a-702c and their respective grating structures 704a-704c cause light to in-couple into the optical element 700, propagate through the optical element 700, and/or out-couple from the optical element 700 according to different regimes (e.g., individually or concurrently in any combination). Five example regimes are shown in FIGS. 9A-9E.

Figure 9A:
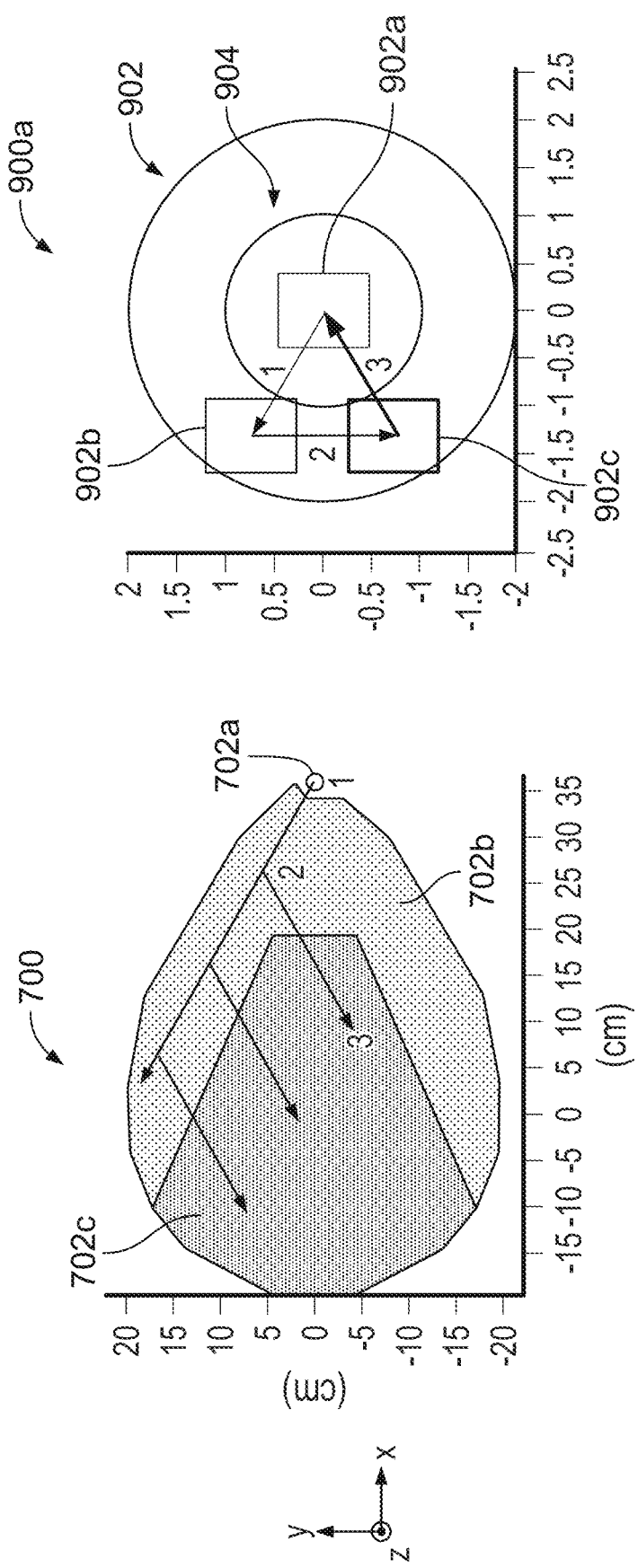
FIGS. 9A-9F show example light in-coupling, light propagation, and light out-coupling regimes of an optical element.

As shown in FIG. 9A, according to a first regime, light is injected into the first region 702a of the optical element 700. Due to the grating structures 704a, at least some of the injected light propagates internally within the optical element 700 from the first region 702a into the second region 702b in a diagonally upward direction along a vector "1." Further, due to the grating structures 704b, at least some of the light is steered such that it propagates internally within the optical element 700 from the second region 702b into the third region 702c in a diagonally downward direction along a vector "2." Further, due to the grating structures 704c, at least some of the light out-couples from the optical element 700 from the third region 702c along a vector "3" (e.g., in the z-direction). According to this regime, the second region 702b functions as an OPE (e.g., as it orthogonally "expands" the spatial distribution of light within the optical element 700), whereas the third region 702c functions as an EPE (e.g., as it out-couples light from the optical element 700 toward the user's eye).

This sequence of in-coupling, propagation, and out-coupling is represented in k-space by the k-space diagram 900a, where the optical element 700 is represented schematically by an outer circle 902, and the material surrounding the optical element 700 (e.g., air, or another optical element) is represented by an inner circle 904. Further, different image fields of view (e.g., as light enters the waveguide, propagates within the waveguide, and ultimately exits the waveguide) are represented by respective rectangles positioned relative to the outer circle 902 and inner circle 904. As shown in the k-space diagram 900a, light is injected into the optical element 700 at the first region 702a, and propagates internally within the optical element 700 to the second region 702b according to a vector "1" extending from the inner circle 904 to the outer circle 902 (e.g., extending from the rectangle 906a to the rectangle 702b). Further, at least some of the light is steered such that it propagates internally within the optical element 700 from the second region 702b into the third region 702c according to a vector "2" extending within the outer circle 902 (e.g., extending from the rectangle 906b to the rectangle 906c). Further, at least some of the light out-couples from the optical element 700 from the third region 702c according to a vector "3" extending from the outer circle 902 back into to inner circle 904 (e.g., extending from the rectangle 906c to the rectangle 906a).

Figure 9B:
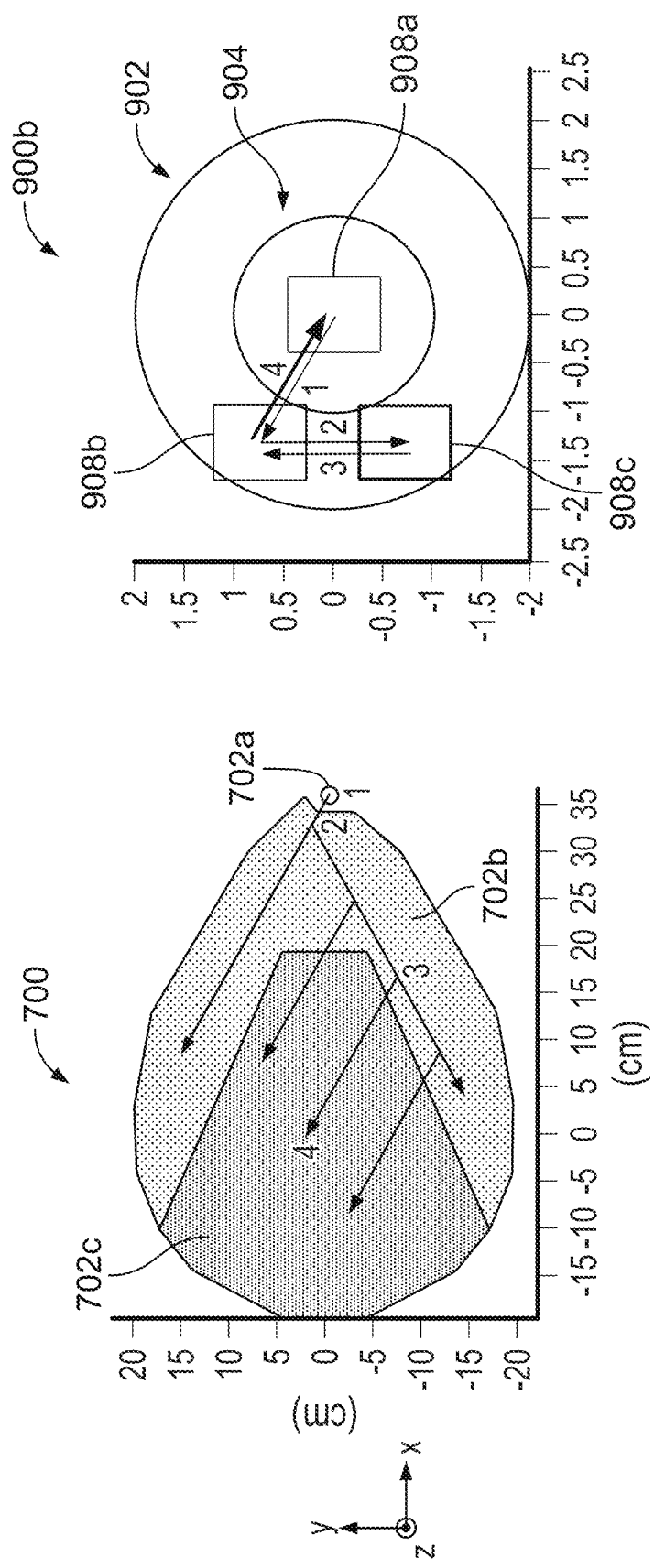

As shown in FIG. 9B, according to a second regime, light is injected into the first region 702a of the optical element 700. Due to the grating structures 704a, at least some of the injected light propagates internally within the optical element 700 from the first region 702a into the second region 702b in a diagonally upward direction along a vector "1." Further, due to the grating structures 704b, at least some of the light is steered such that it continues to propagate internally within the optical element 700 in the second region 702b in a diagonally downward direction along a vector "2." Further, due to the grating structures 704b, at least some of the light is in turn steered such that it propagates internally within the optical element 700 from the second region 702b into the third region 702c in a diagonally upward direction along a vector "3." Further, due to the grating structures 704c, at least some of the light out-couples from the optical element 700 from the third region 702c along a vector "4" (e.g., in the z-direction). According to this regime, the second region 702b functions as an OPE (e.g., as it orthogonally "expands" the spatial distribution of light within the optical element 700), whereas the third region 702c functions as an EPE (e.g., as it out-couples light from the optical element 700 toward the user's eye).

This sequence of in-coupling, propagation, and out-coupling is represented in k-space by the k-space diagram 900b. As shown in the k-space diagram 900b, light is injected into the optical element 700 at the first region 702a, and propagates internally within the optical element 700 to the second region 702b according to a vector "1" extending from the inner circle 904 to the outer circle 902 (e.g., extending from the rectangle 908a to the rectangle 908b). Further, at least some of the light is steered such that it continues to propagate internally within the optical element 700 in the second region 702b according to a vector "2" extending entirely within the outer circle 902 (e.g., extending from the rectangle 908b to the rectangle 908c). Further, at least some of the light is steered such that it propagates internally within the optical element 700 from the second region 702b into the third region 702c according to a vector "3" extending entirely within the outer circle 902 (e.g., extending from the rectangle 908c to the rectangle 908b). Further, at least some of the light out-couples from the optical element 700 from the third region 702c according to a vector "4" extending from the outer circle 902 back into to inner circle 904 (e.g., extending from the rectangle 908b to the rectangle labeled 908a).

Figure 9C:
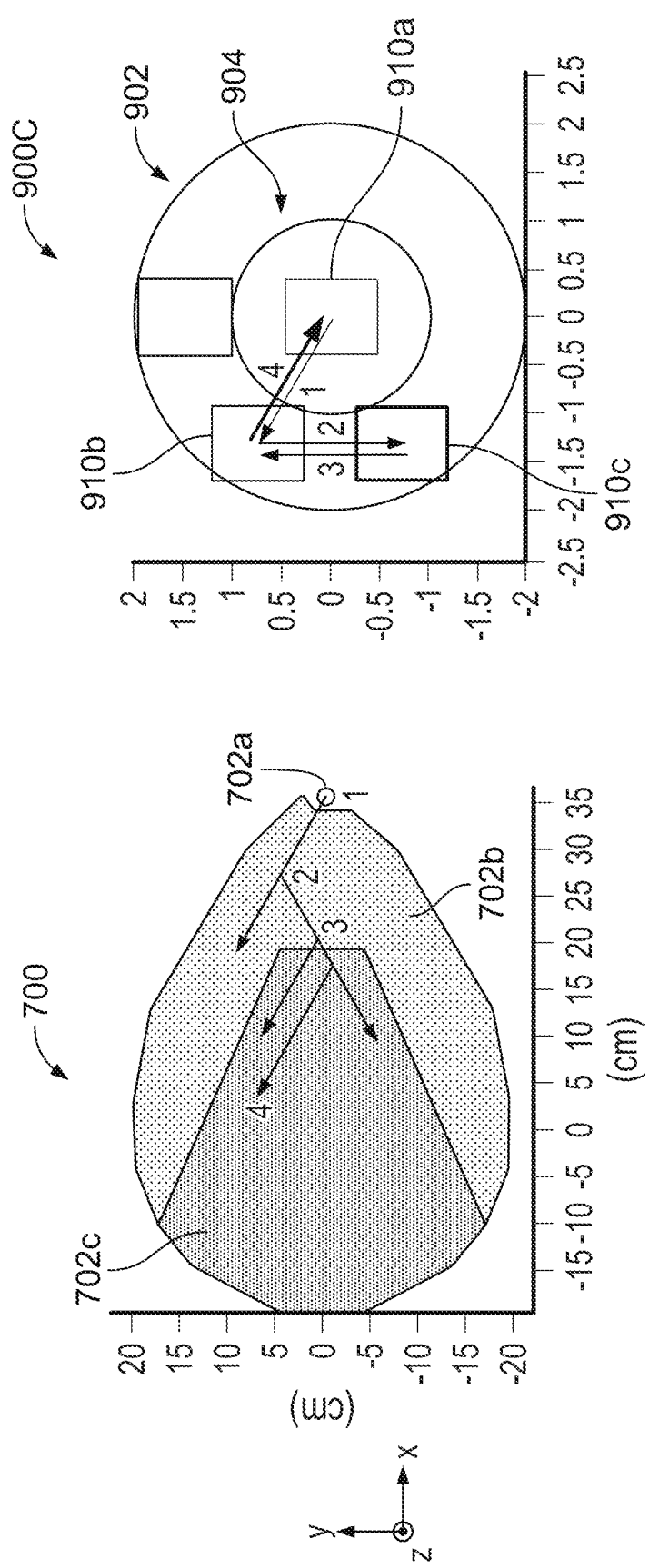

As shown in FIG. 9C, according to a third regime, light is injected into the first region 702a of the optical element 700. Due to the grating structures 704a, at least some of the injected light propagates internally within the optical element 700 from the first region 702a into the second region 702b in a diagonally upward direction along a vector "1." Further, due to the grating structures 704b, at least some of the light is in turn steered such that it propagates internally within the optical element 700 from the second region 702b towards the third region 702c in a diagonally downward direction along a vector "2." Further, due to the grating structures 704b and/or 702c, at least some of the light is steered such that it propagates internally within the optical element 700 in the third region 702c in a diagonally upward direction along a vector "3." Further, due to the grating structures 704c, at least some of the light out-couples from the optical element 700 from the third region 702c along a vector "4" (e.g., in the z-direction). According to this regime, the second region 702b functions as an OPE (e.g., as it orthogonally "expands" the spatial distribution of light within the optical element 700), whereas the third region 702c functions as an EPE (e.g., as it out-couples light from the optical element 700 toward the user's eye).

This sequence of in-coupling, propagation, and out-coupling is represented in k-space by the k-space diagram 900c. As shown in the k-space diagram 900c, light is injected into the optical element 700 at the first region 702a, and propagates internally within the optical element 700 to the second region 702b according to a vector "1" extending from the inner circle 904 to the outer circle 902 (e.g., extending from the rectangle 910a to the rectangle 910b). Further, at least some of the light is steered such that it propagates internally within the optical element 700 towards the third region 702*c* according to a vector "2" extending entirely within the outer circle 902 (e.g., extending from the rectangle 910*b* to the rectangle 910*c*). Further, at least some of the light is steered such that it propagates internally within the optical element 700 in the third region 702*c* according to a vector "3" extending entirely within the outer circle 902 (e.g., extending from the rectangle 910*c* to the rectangle 910*b*). Further, at least some of the light out-couples from the optical element 700 from the third region 702*c* according to a vector "4" extending from the outer circle 902 back into to inner circle 904 (e.g., extending from the rectangle 910*b* to the rectangle 910*a*).

Figure 9D:
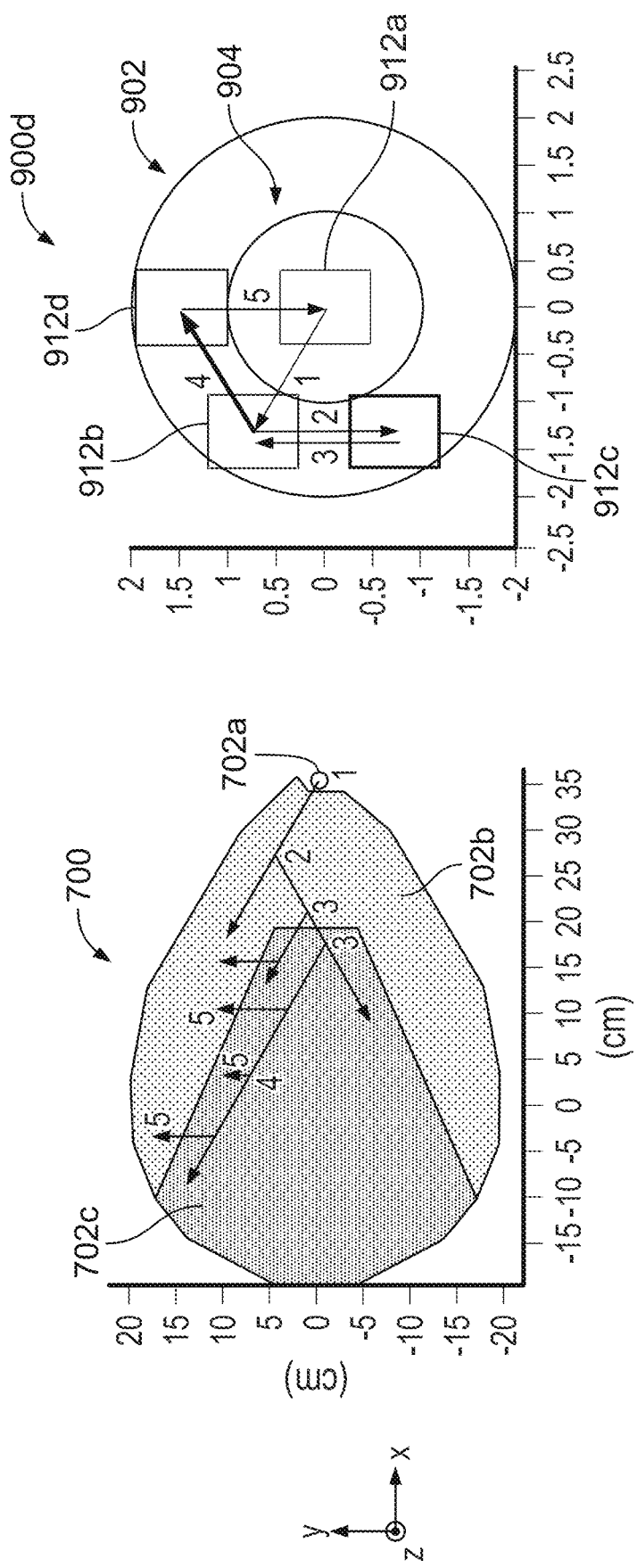

As shown in FIG. 9D, according to a fourth regime, light is injected into the first region 702*a* of the optical element 700. Due to the grating structures 704*a*, at least some of the injected light propagates internally within the optical element 700 from the first region 702*a* into the second region 702*b* in a diagonally upward direction along a vector "1." Further, due to the grating structures 704*b*, at least some of the light is in turn steered such that it propagates internally within the optical element 700 from the second region 702*b* towards the third region 702*c* in a diagonally downward direction along a vector "2." Further, due to the grating structures 704*b* and/or 702*c*, at least some of the light is steered such that it propagates internally within the optical element 700 in the third region 702*c* in a diagonally upward direction along a vector "3." Further, due to the grating structures 704*c*, at least some of the light is steered such that it propagates internally within the optical element 700 back towards the second region 702*b* in an upward direction along a vector "4." Further, due to the grating structures 704*b*, at least some of the light out-couples from the optical element 700 from the second region 702*b* along a vector "5" (e.g., in the z-direction). According to this regime, the second region 702*b* functions as an EPE (e.g., as it out-couples light from the optical element 700 toward the user's eye), whereas the third region 702*c* functions as an OPE (e.g., as it orthogonally "expands" the spatial distribution of light within the optical element 700).

This sequence of in-coupling, propagation, and out-coupling is represented in k-space by the k-space diagram 900*d*. As shown in the k-space diagram 900*d*, light is injected into the optical element 700 at the first region 702*a*, and propagates internally within the optical element 700 to the second region 702*b* according to a vector "1" extending from the inner circle 904 to the outer circle 902 (e.g., extending from the rectangle 912*a* to the rectangle 912*b*). Further, at least some of the light is steered such that it propagates internally within the optical element 700 towards the third region 702*c* according to a vector "2" extending entirely within the outer circle 902 (e.g., extending from the rectangle 912*b* to the rectangle 912*c*). Further, at least some of the light is steered such that it propagates internally within the optical element 700 in the third region 702*c* according to a vector "3" extending entirely within the outer circle 902 (e.g., extending from the rectangle 912*c* to the rectangle 912*b*). Further, at least some of the light is steered such that it propagates internally within the optical element 700 back towards the second region 702*b* according to a vector "4" extending entirely within the outer circle 902 (e.g., extending from the rectangle 912*b* to the rectangle 912*d*). Further, at least some of the light out-couples from the optical element 700 from the second region 702*b* according to a vector "5" extending from the outer circle 902 back into to inner circle 904 (e.g., extending from the rectangle 912*d* to the rectangle 912*a*).

Figure 9E:
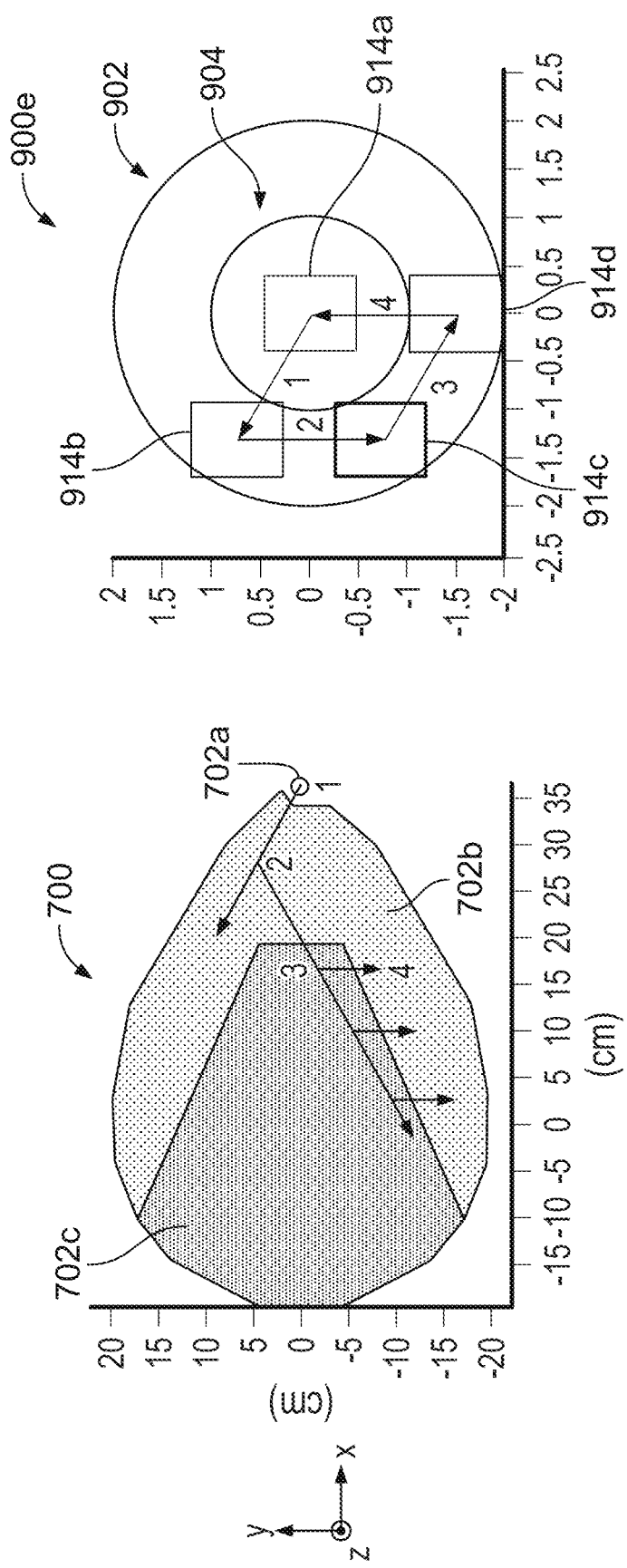

As shown in FIG. 9E, according to a fifth regime, light is injected into the first region 702*a* of the optical element 700. Due to the grating structures 704*a*, at least some of the injected light propagates internally within the optical element 700 from the first region 702*a* into the second region 702*b* in a diagonally upward direction along a vector "1." Further, due to the grating structures 704*b*, at least some of the light is in turn steered such that it propagates internally within the optical element 700 from the second region 702*b* towards the third region 702*c* in a diagonally downward direction along a vector "2." Further, due to the grating structures 704*c*, at least some of the light is steered such that it propagates internally within the optical element 700 back towards the second region 702*b* in a downward direction along a vector "3." Further, due to the grating structures 704*b*, at least some of the light out-couples from the optical element 700 from the second region 702*b* along a vector "4" (e.g., in the z-direction). According to this regime, the second region 702*b* functions as an EPE (e.g., as it out-couples light from the optical element 700 toward the user's eye), whereas the third region 702*c* functions as an OPE (e.g., as it orthogonally "expands" the spatial distribution of light within the optical element 700).

This sequence of in-coupling, propagation, and out-coupling is represented in k-space by the k-space diagram 900*d*. As shown in the k-space diagram 900*d*, light is injected into the optical element 700 at the first region 702*a*, and propagates internally within the optical element 700 to the second region 702*b* according to a vector "1" extending from the inner circle 904 to the outer circle 902 (e.g., extending from the rectangle 914*a* to the rectangle 914*b*). Further, at least some of the light is steered such that it propagates internally within the optical element 700 towards the third region 702*c* according to a vector "2" extending entirely within the outer circle 902 (e.g., extending from the rectangle 914*b* to the rectangle 914*c*). Further, at least some of the light is steered such that it propagates internally within the optical element 700 back towards the second region 702*b* according to a vector "3" extending entirely within the outer circle 902 (e.g., extending from the rectangle 914*c*). Further, at least some of the light out-couples from the optical element 700 from the second region 702*b* according to a vector "4" extending from the outer circle 902 back into to inner circle 904 (e.g., extending from the rectangle 914*d* to the rectangle 914*a*).

Figure 9F:
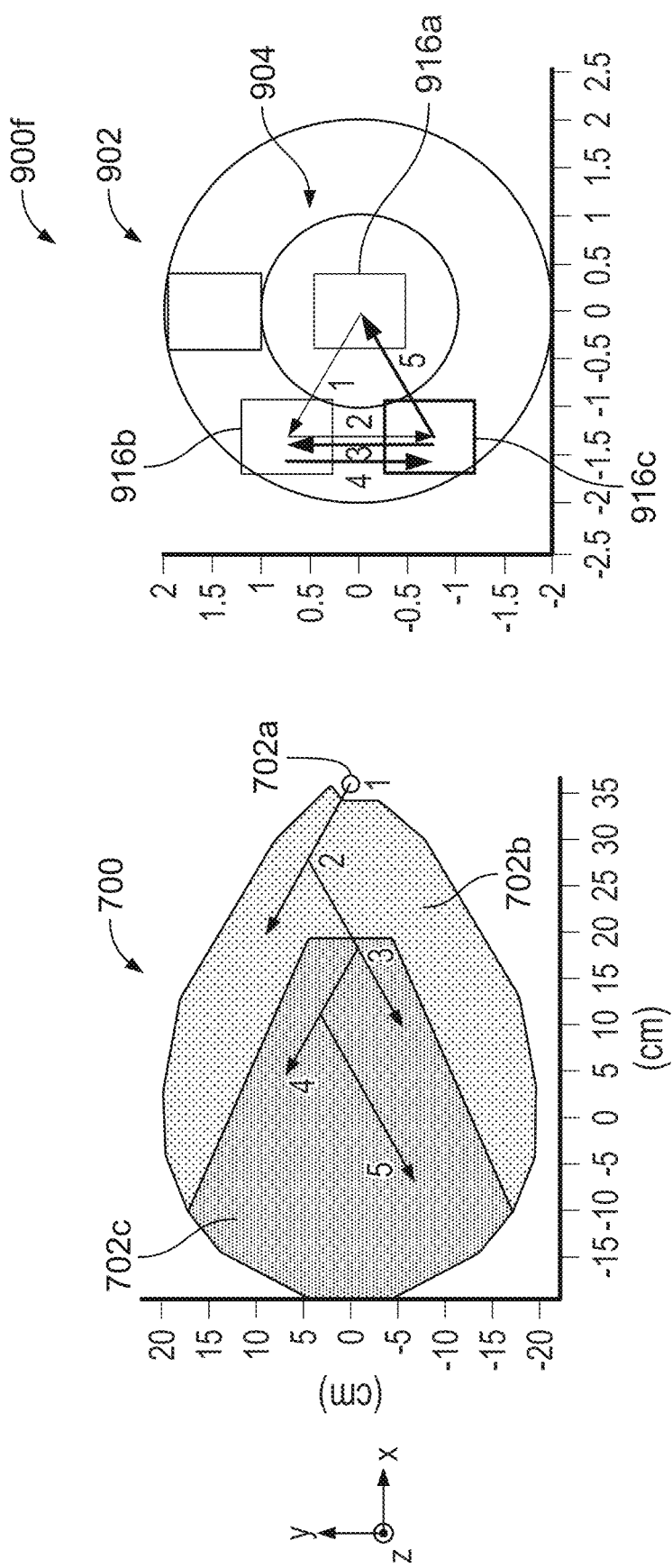

As shown in FIG. 9F, according to a sixth regime, light is injected into the first region 702*a* of the optical element 700. Due to the grating structures 704*a*, at least some of the injected light propagates internally within the optical element 700 from the first region 702*a* into the second region 702*b* in a diagonally upward direction along a vector "1." Further, due to the grating structures 704*b*, at least some of the light is in turn steered such that it propagates internally within the optical element 700 from the second region 702*b* towards the third region 702*c* in a diagonally downward direction along a vector "2." Further, due to the grating structures 704*c*, at least some of the light is steered such that it propagates internally within the optical element 700 in a diagonally upward direction along a vector "3," while remaining in the third region 702*c*. Further, due to the grating structures 704*c*, at least some of the light is in turn steered such that it propagates internally within the optical element 700 in a diagonally downward direction along a vector "4," while remaining in the third region 702*c*. Further, due to the grating structures 704*c*, at least some of the light out-couples from the optical element 700 from the third region 702*c* along a vector "5" (e.g., in the z-direction).

According to this regime, the second region 702b functions as an OPE (e.g., as it orthogonally "expands" the spatial distribution of light within the optical element 700), whereas the third region 702c functions as both an OPE (e.g., as it orthogonally "expands" the spatial distribution of light within the optical element 700) and an EPE (e.g., as it out-couples light from the optical element 700 toward the user's eye).

This sequence of in-coupling, propagation, and out-coupling is represented in k-space by the k-space diagram 900f. As shown in the k-space diagram 900d, light is injected into the optical element 700 at the first region 702a, and propagates internally within the optical element 700 to the second region 702b according to a vector "1" extending from the inner circle 904 to the outer circle 902 (e.g., extending from the rectangle 916a to the rectangle 916b). Further, at least some of the light is steered such that it propagates internally within the optical element 700 towards the third region 702c according to a vector "2" extending entirely within the outer circle 902 (e.g., extending from the rectangle 916b to the rectangle 916c). Further, at least some of the light is steered such that it propagates internally within the optical element 700 within the third region 702c according to vectors "3" and "4" extending entirely within the outer circle 902 (e.g., extending from the rectangle 916c to the rectangle 916b and back again). Further, at least some of the light out-couples from the optical element 700 from the third region 702c according to a vector "5" extending from the outer circle 902 back into to inner circle 904 (e.g., extending from the rectangle 916c to the rectangle 916a).

Light can in-couple into the optical element 700, propagate through the optical element 700, and/or out-couple from the optical element 700 according one or more of the aforementioned regimes concurrently. This enables the optical element 700 to project images across a larger portion of its surface. For example, the optical element 700 can emit light towards a user's eye from both the second region 702b and the third region 702c, rather than from just the second region 702b or third region 702c alone. This can be beneficial, for example, as it enables the wearable display system 60 to project images according to a wider field of view than might otherwise be possible (e.g., using traditional optical element configurations). For instance, in some implementations, wearable display systems 60 having eyepieces formed from the optical elements described herein can project images according to a field of view of 45°×55° or wider. In comparison, wearable display systems 60 having eyepieces formed from other optical elements (e.g., traditional optical element configurations) can project images according to a field of view of 40°×40° or narrower.

Further, one or more of the optical elements described herein can be formed by defining grating structures a single surface of the optical element (e.g., the surface of the optical element that faces away from the user's eye when the wearable display system 60 is worn by the user). This is beneficial, for example, as it enables the optical element to be produced more easily (e.g., compared to an optical element having grating structures defined on multiple different surfaces). The surface opposite the surface having the grating structures can be optically smooth and/or substantially planar.

For example, according to some other optical element configurations, grating structures are defined on opposing surfaces of an optical element. However, fabricating grating structures on both surfaces of an optical element requires double-sided processing techniques (e.g., double-sided nanoimprinting) with strict alignment and tolerances. Further, even relatively small angular misalignments can lead to degradation of optical performance (e.g., degradation in the quality of projected images) and/or variations between optical elements. Further still, specialized tools may be required to perform a double-sided manufacturing process, which can increase costs and manufacturing complexity. In contrast, it may be more efficient and simple to form optical elements having grating structures of a single surface. Further, the resulting optical elements may exhibit higher optical performance, and may be more consistent from element to element.

In some implementations, each of the regions of the optical element 700 can include grating structures having the same diffraction efficiency across the region. For example, referring to FIG. 7, the first region 702a can include grating structures 704a having a uniform diffraction efficiency across the first region 702a. Similarly, the second region 702b can include grating structures 704b having a uniform diffraction efficiency across the second region 702b, and the third region 702c can include grating structures 704a having a uniform diffraction efficiency across the third region 702c.

Figure 10:
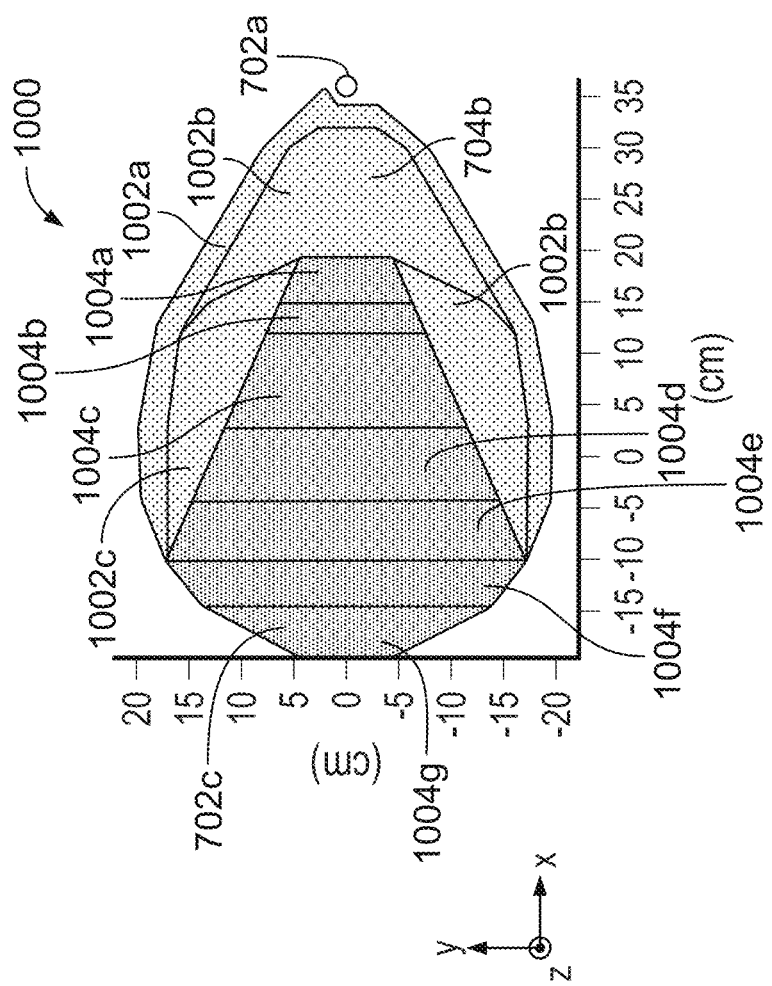
FIG. 10 shows another example optical element.

In some implementations, one or more of the regions of the optical element 700 can include grating structures with varying diffraction efficiency across the region. For example, referring to FIG. 10, an optical structure 1000 can include three regions 702a-702c (e.g., in a similar manner as described with respect to FIG. 7). However, in this example, the second region 702b is further divided into sub-regions 1002a-1002d, and the third region 702c is further divided into sub-regions 1004a-1004g.

The diffraction structures in each of sub-regions can have different diffraction efficiencies compared to those of their neighboring sub-regions. As an example, in the second region 702b, the grating structures of the sub-region 1002a can have a first diffraction efficiency, the grating structures of the sub-region 1002b can have a second diffraction efficiency different from the first, and the grating structures of the sub-regions 1002c and 1002d can have a third diffraction efficiency different from the first and the second. As an example, in the third region 702c, the grating structures of the sub-regions 1004a-1004g each can have diffraction efficiencies different from those of the neighboring sub-regions. The diffraction efficiency of grating structures can be varied, for example, by varying the depth, duty cycle, blazing angle, and/or other physical characteristics of the grating structures.

In some implementations, the diffraction efficiency of the grating structures of a sub-region can increase with increasing distance between the sub-region and the first region 702a (e.g., the ICG). This can be beneficial, for example, in producing an image having a more consistent intensity across the extent of optical element. For instance, when light is injected into the first region 702a, more light will be present within the optical element 700 in areas nearby the first region 702a, whereas less light will be present within the optical element 700 in areas distant the first region 702a. By increasing the diffraction efficiency of grating structures in a sub-region based on the distance between the sub-region and the first region 702a, the intensity of light that is out-coupled from each of the sub-regions will be more consistent across the extent to the optical element.

In some implementations, among the sub-regions 1002a-1002d, the grating structures of the sub-region 1002a can have the lowest diffractive efficiency, followed by the grating structures of the sub-region 1002b, and followed by the grating structures of the sub-regions 1002c and 1002d. In some implementations, among the sub-regions 1004a-

1002g, the grating structures of the sub-region 1004a can have the lowest diffractive efficiency, and the grating structures of the sub-regions 1004b-1004g can have successively increasing diffractive efficiencies from the sub-region 1004b to the sub-region 1004g.

Figure 11:
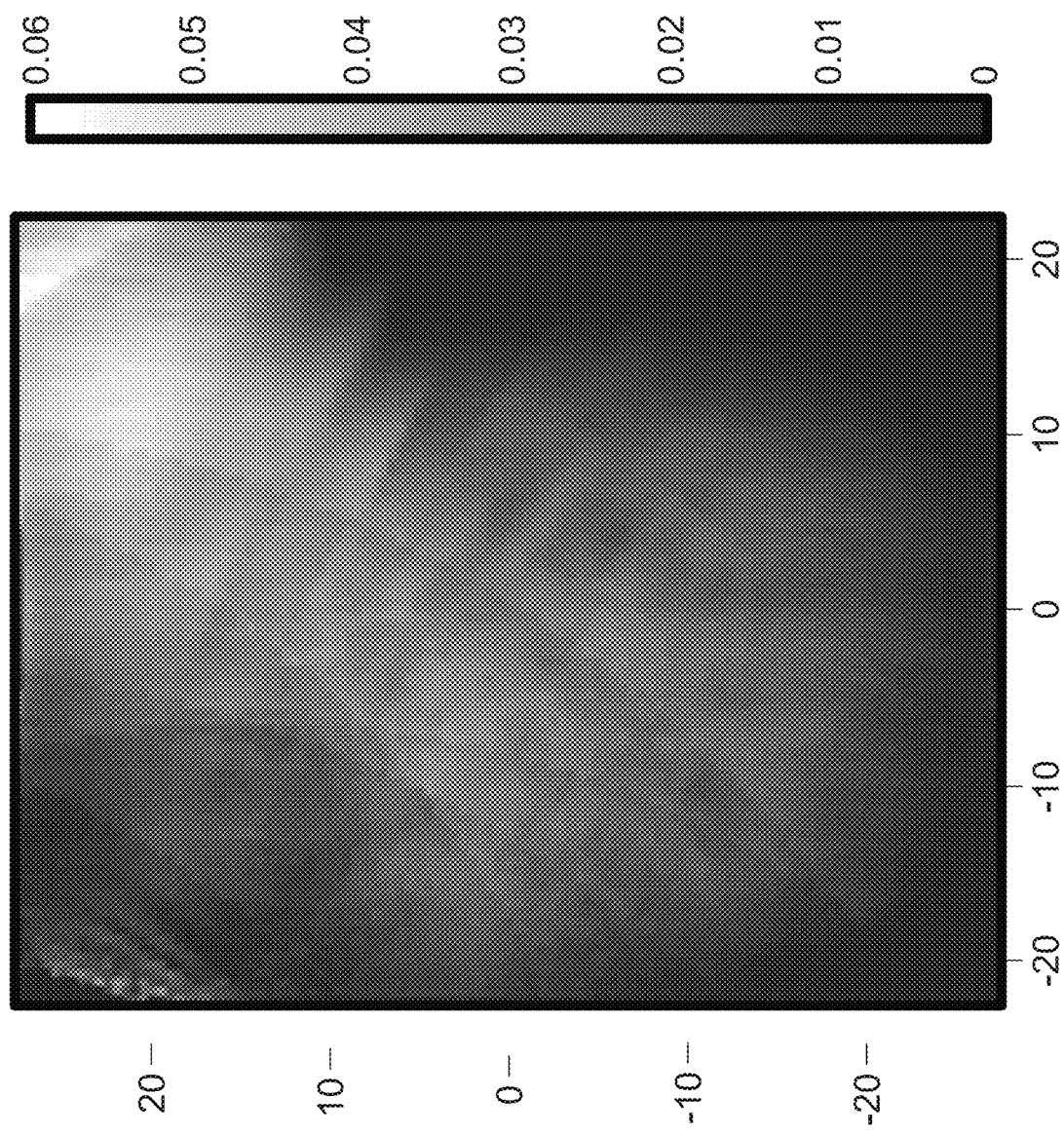
FIG. 11 shows a plot of the simulated far-field efficiency of an example optical element.

FIG. 11 shows a plot 1100 of the simulated far-field efficiency of an example optical element designed according to the techniques described herein. The plot 1100 was generated using rigorous coupled-wave analysis (RCWA) and ray-tracing techniques. As shown in FIG. 11, the optical element achieved an average eye-box efficiency of 2.4% when using a resist material having a refraction index n of 1.8 and substrate thickness of 500 um. Further, the optical element exhibits a relatively uniform far-field image across the whole field-of-view, with uniformity score of 1.06 over the entire field of view, and 0.78 across 80% of the field of view. The plot 1100 was generated without gamma correction. If anti-reflection coating is added to the surface of the optical element without any grating structures (e.g., the surface opposite that facing the user), the eye-box efficiency of the optical element can be further improved.

Figure 12:
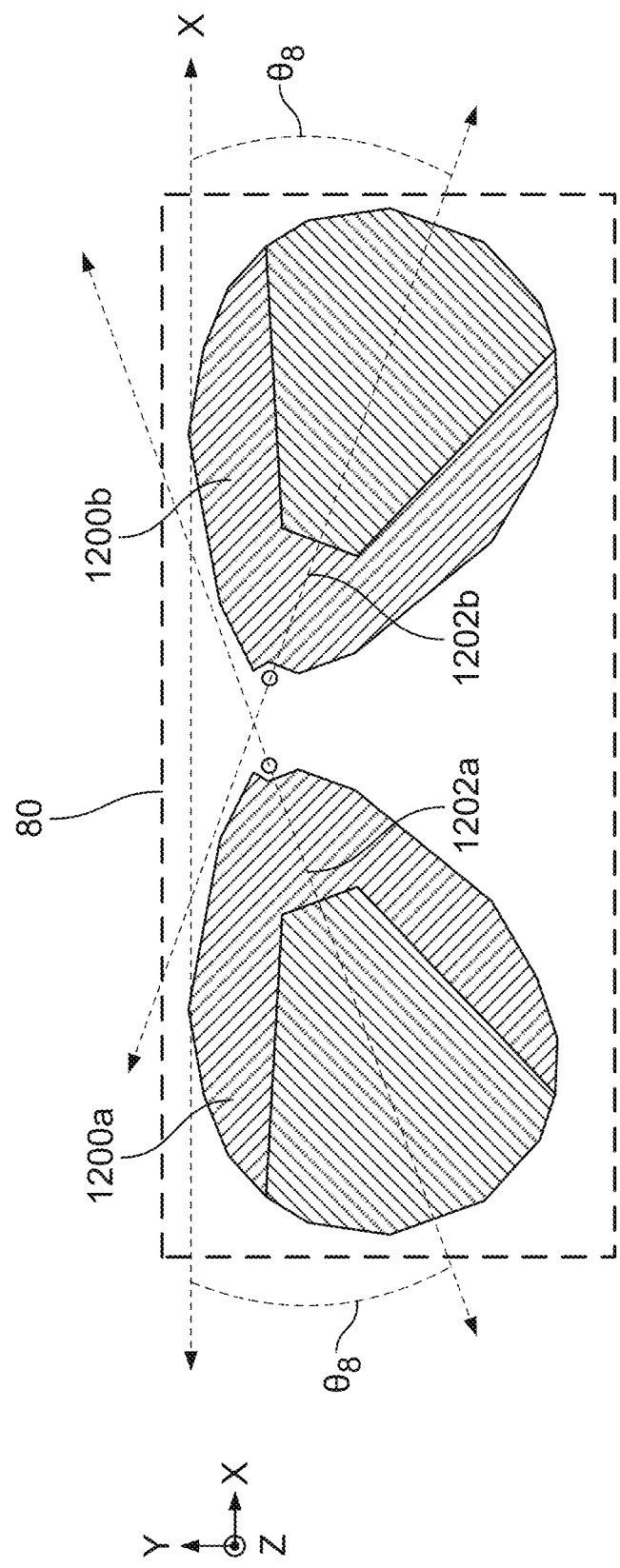
FIG. 12 shows example optical elements and a frame.

One or more of the optical elements described herein can be incorporated into a wearable display system 60. For example, one or more of the optical elements described herein can be used in conjunction to project images towards a user's eye to depict three dimensional image data. Further, the orientation of the optical elements can vary, depending on the application. As an example, FIG. 12 shows the orientation of two optical elements 1200a and 1200b secured within a frame 80. The frame 80 is aligned parallel to the x-axis, and the optical elements 1200a and 1200b are positioned on opposite side of the frame with respect to the x-axis. When the user wears the frame 80, the optical elements 1200a and 1200b are positioned on respective ones of the user's eyes. Further, the optical element 1200a includes a major axis 1202a bisecting the optical element 1200a widthwise, and the optical element 1200b includes a major axis 1202b bisecting the optical element 1200b widthwise. The major axes 1202a and 1202b are angled relative to the x-axis by an angle $\theta_g$. In practice, the angle $\theta_g$ can vary, depending on the application. In some implementations, the angle $\theta_g$ can be between 20° and 30°.

Figure 13:
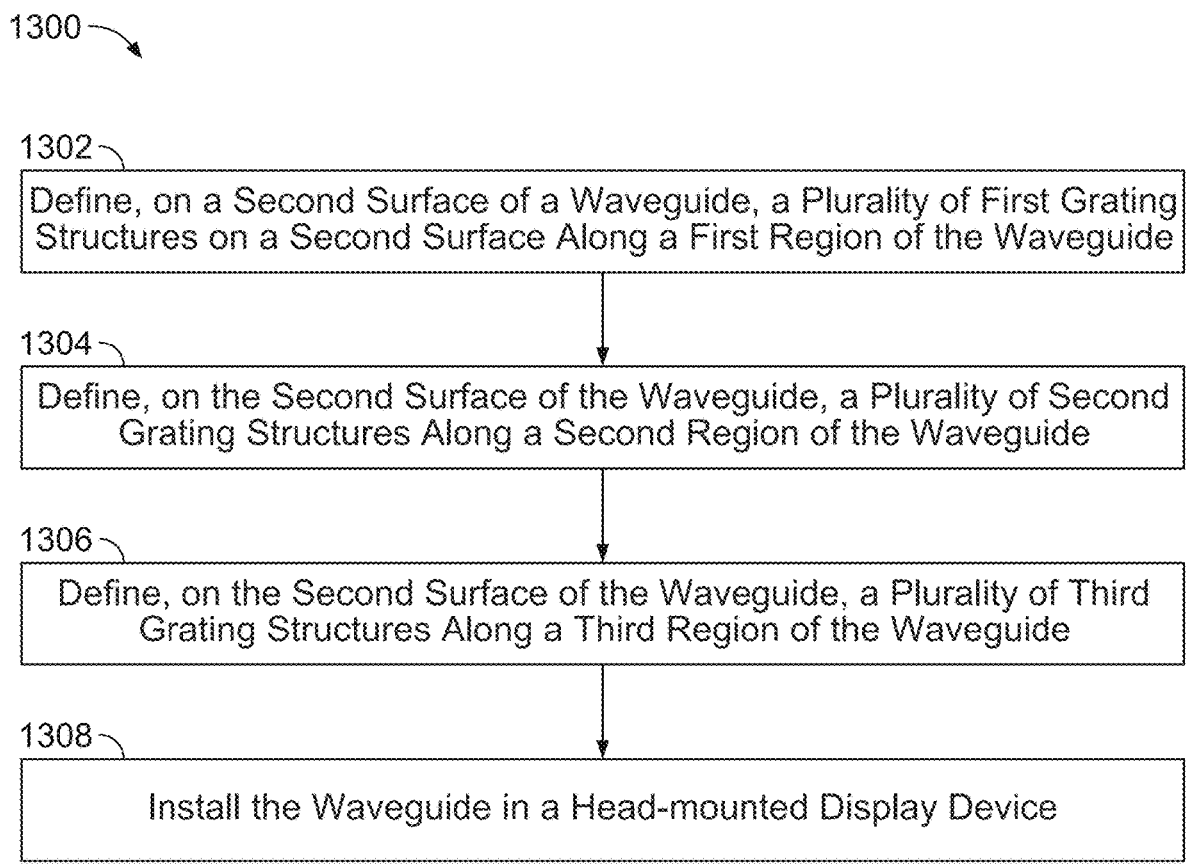
FIG. 13 is a flow chart diagrams of an example process for constructing a head-mounted display device using the optical elements and grating structures described herein.

FIG. 13 shows an example process 1300 for constructing a head-mounted display device using the optical elements and grating structures described herein.

According to the process 1300, a waveguide having a first substantially planar surface and a second surface opposite the first surface is formed. For instance, one or more of the optical elements described herein (e.g., the optical elements 700, 1000, 1200a, and/or 1200b) can be formed.

Forming the waveguide includes defining a plurality of first grating structures on the second surface along a first region of the waveguide (step 1302). The plurality of first grating structures are configured to diffract light in the first region of the waveguide according to a first set of one or more grating vector. Examples of the first grating structures and the first region are shown and described, for instance, with respect to FIGS. 7, 8A, and 10 (e.g., the region 702a and the grating structures 704a).

Forming the waveguide also includes defining a plurality of second grating structures on the second surface along a second region of the waveguide different from the first region (step 1304). The plurality of second grating structures are configured to diffract light in the second region of the waveguide according to a second set of one or more grating vectors different from the first set of one or more grating vectors. Examples of the second grating structures and the second region are shown and described, for instance, with respect to FIGS. 7, 8B, and 10 (e.g., the region 702b and the grating structures 704b).

Forming the waveguide also includes defining a plurality of third grating structures on the second surface along a third region of the waveguide different from the first and second regions (step 1306). The plurality of third grating structures are configured to diffract incident light according to a third set of one or more grating vectors different from the first set of one or more grating vectors and the second set of one or more grating vectors. Examples of the third grating structures and the third region are shown and described, for instance, with respect to FIGS. 7, 8B, and 10 (e.g., the region 702c and the grating structures 704c).

In some implementations, each of the grating structures can be defined concurrently or substantially concurrently (e.g., imprinted using a common mold). In some implementations, after the grating structures are imprinted, a layer of material (e.g., metal) can be coated onto at least a portion of the waveguide.

The waveguide is installed in a head-mounted display device (step 1308). As an example, the waveguide can be used, either alone or in combination with one or more other waveguides, as an eyepiece in the head-mounted display device.

In some implementations, the waveguide can be integrally formed (e.g., as a single monolithic piece).

In some implementations, at least one of the plurality of first grating structures, the plurality of second grating structures, or the plurality of third grating structures are imprinted using one or more lithography processes. The lithography processes can include, for example, one or more etching and/or deposition steps.

Some implementations of subject matter and operations described in this specification can be implemented in digital electronic circuitry, or in computer software, firmware, or hardware, including the structures disclosed in this specification and their structural equivalents, or in combinations of one or more of them. For example, in some implementations, the local processing and data module 140, the remote processing module 150, and/or the remote data repository 160 can be implemented using digital electronic circuitry, or in computer software, firmware, or hardware, or in combinations of one or more of them. In another example, the process 1300 shown in FIG. 1300 can be implemented, at least in part, using digital electronic circuitry, or in computer software, firmware, or hardware, or in combinations of one or more of them (e.g., as a part of an automated or computer-assisted manufacturing process).

Some implementations described in this specification can be implemented as one or more groups or modules of digital electronic circuitry, computer software, firmware, or hardware, or in combinations of one or more of them. Although different modules can be used, each module need not be distinct, and multiple modules can be implemented on the same digital electronic circuitry, computer software, firmware, or hardware, or combination thereof.

Some implementations described in this specification can be implemented as one or more computer programs, i.e., one or more modules of computer program instructions, encoded on computer storage medium for execution by, or to control the operation of, data processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read only memory or a random access memory or both. A computer includes a processor for performing actions in accordance with instructions and one or more memory devices for storing instructions and data. A computer may also include, or be operatively coupled to receive data from or transfer data to, or both, one or more mass storage devices for storing data, e.g., magnetic, magneto optical disks, or optical disks. However, a computer need not have such devices. Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. The processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

Figure 14:
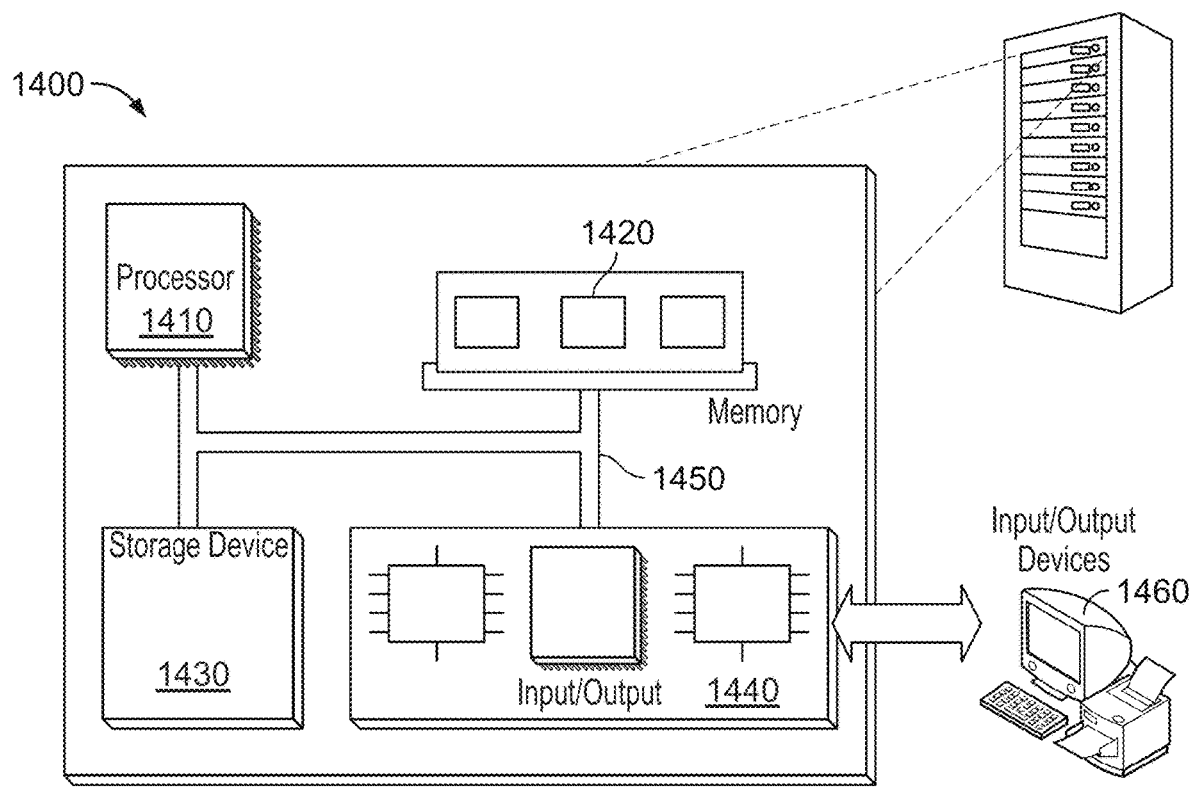
FIG. 14 is a diagram of an example computer system.

FIG. 14 shows an example computer system 1400 that includes a processor 1410, a memory 1420, a storage device 1430 and an input/output device 1440. Each of the components 1410, 1420, 1430 and 1440 can be interconnected, for example, by a system bus 1450. The processor 1410 is capable of processing instructions for execution within the system 1400. In some implementations, the processor 1410 is a single-threaded processor, a multi-threaded processor, or another type of processor. The processor 1410 is capable of processing instructions stored in the memory 1420 or on the storage device 1430. The memory 1420 and the storage device 1430 can store information within the system 1400.

The input/output device 1440 provides input/output operations for the system 1400. In some implementations, the input/output device 1440 can include one or more of a network interface device, e.g., an Ethernet card, a serial communication device, e.g., an RS-232 port, and/or a wireless interface device, e.g., an 802.11 card, a 3G wireless modem, a 4G wireless modem, etc. In some implementations, the input/output device can include driver devices configured to receive input data and send output data to other input/output devices, e.g., keyboard, printer and display devices 1460. In some implementations, mobile computing devices, mobile communication devices, and other devices can be used.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable subcombination.

A number of implementations have been described. Nevertheless, it will be understood that various modifications may be made without departing from the spirit and scope of the invention. Accordingly, other implementations are within the scope of the following claims.

What is claimed is:

1. A method comprising:
   obtaining a waveguide comprising a first surface and a second surface opposite the first surface,
      wherein in a first region of the waveguide, the second surface defines a plurality of first grating structures configured to diffract light according to a first diffraction pattern,
      wherein in a second region of the waveguide different from the first region, the second surface defines a plurality of second grating structures configured to diffract light according to a second diffraction pattern different from the first diffraction pattern,
      wherein in a third region of the waveguide different from the first and second regions, the second surface defines a plurality of third grating structures configured to diffract light according to a third diffraction pattern different from the first and second diffraction patterns; and
      wherein the second region of the waveguide at least partially encloses the third region of the waveguide;
   directing light into the first region of the waveguide;
   transmitting at least some of the light from the first region to the second region of the waveguide;
   transmitting at least some of the light from the second region to the third region of the waveguide; and
   outputting at least some of the light from the third region of the waveguide.

2. The method of claim 1, wherein directing light into the first region of the waveguide comprises directing the light from a light projector into the first region of the waveguide.

3. The method of claim 1, wherein the light represents one or more images.

4. The method of claim 1, wherein further comprising outputting at least some of the light from the third region of the waveguide towards an eye of a user.

5. The method of claim 4, wherein the user is wearing a head-mounted display device comprising the waveguide.

6. The method of claim 1, further comprising:
   propagating at least some of the light within the second region of the waveguide.

7. The method of claim 6, wherein propagating at least some of the light within the second region of the waveguide comprises expanding, in a first direction, a spatial distribution of at least some of the light within the second region of the waveguide.

8. The method of claim 7, further comprising:
   propagating at least some of the light within the third region of the waveguide.

9. The method of claim 8, wherein propagating at least some of the light within the third region of the waveguide comprises expanding, in a second direction, the spatial distribution of at least some of the light within the third region of the waveguide.

10. The method of claim 9, wherein the first direction is orthogonal to the second direction.

* * * * *